(12) United States Patent
Yamamoto

(10) Patent No.: US 11,777,388 B2
(45) Date of Patent: Oct. 3, 2023

(54) TRANSPORT SYSTEM, MOVER, CONTROL APPARATUS, AND CONTROL METHOD

(71) Applicant: CANON KABUSHIKI KAISHA, Tokyo (JP)

(72) Inventor: Takeshi Yamamoto, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/737,265

(22) Filed: May 5, 2022

(65) Prior Publication Data

US 2022/0263398 A1 Aug. 18, 2022

Related U.S. Application Data

(63) Continuation of application No. 17/164,537, filed on Feb. 1, 2021, now Pat. No. 11,374,479, which is a
(Continued)

(30) Foreign Application Priority Data

Aug. 8, 2018 (JP) .................................. 2018-149579
Dec. 10, 2018 (JP) .................................. 2018-231005

(51) Int. Cl.
*H02K 41/03* (2006.01)
*H02K 11/21* (2016.01)
(Continued)

(52) U.S. Cl.
CPC ........... *H02K 41/031* (2013.01); *B65G 54/02* (2013.01); *H02K 11/21* (2016.01); *H02N 15/00* (2013.01); *H02P 25/064* (2016.02)

(58) Field of Classification Search
CPC .. H02K 41/031; H02K 11/21; H02K 2213/03; B65G 54/02; B65G 43/08;
(Continued)

(56) References Cited

U.S. PATENT DOCUMENTS 5,032,975 A 7/1991 Yamamoto
5,136,222 A 8/1992 Yamamoto
(Continued)

FOREIGN PATENT DOCUMENTS

CN 101098100 A 1/2008
CN 102210082 A 5/2011
(Continued)

OTHER PUBLICATIONS

Chinese Notification to Grant Patent dated May 16, 2022 in corresponding Chinese Application No. 201910716617.6 (English-language translation not available).
(Continued)

*Primary Examiner* — David Luo
(74) *Attorney, Agent, or Firm* — VENABLE LLP

(57) ABSTRACT

A transport system includes: a mover having a first magnet group arranged in parallel to a first direction and a second magnet group arranged in parallel to a second direction crossing the first direction; and a plurality of coils arranged in parallel to the first direction so as to be able to face the first magnet group and the second magnet group, and the mover is able to move in the first direction along the plurality of coils by electromagnetic force received by the first magnetic group from the plurality of coils while an attitude of the mover is controlled by electromagnetic force received by the first magnetic group or the second magnetic group from the plurality of coils.

18 Claims, 21 Drawing Sheets

Related U.S. Application Data continuation of application No. 16/531,684, filed on Aug. 5, 2019, now Pat. No. 10,944,314.

(51) Int. Cl.
  *H02P 25/064* (2016.01)
  *B65G 54/02* (2006.01)
  *H02N 15/00* (2006.01)

(58) Field of Classification Search
  CPC ......... H02N 15/00; H02P 25/064; H02P 6/17; H02P 25/06
  USPC ................................ 318/135, 687, 671, 560
  See application file for complete search history.

(56) References Cited

U.S. PATENT DOCUMENTS

| | | | |
|---|---|---|---|
| 6,078,663 | A | 6/2000 | Yamamoto |
| 6,462,491 | B1 | 10/2002 | Iijima |
| 6,597,790 | B1 | 7/2003 | Yamamoto |
| 6,693,402 | B2 * | 2/2004 | Ebihara ............... G03F 7/70725 414/935 |
| 6,952,086 | B1 * | 10/2005 | Krefta ................. H02K 41/025 318/135 |
| 7,071,865 | B2 | 7/2006 | Shibamiya |
| 7,296,234 | B2 | 11/2007 | Fukuda |
| 7,375,479 | B2 | 5/2008 | Van Eijk |
| 7,496,278 | B2 | 2/2009 | Miyamoto |
| 7,522,087 | B2 | 4/2009 | Shibamiya |
| 7,557,529 | B2 | 7/2009 | Tanaka |
| 7,898,204 | B2 | 3/2011 | Hunter |
| 8,023,802 | B2 | 9/2011 | Miyamoto |
| 10,118,774 | B2 | 11/2018 | Tomoda |
| 10,294,042 | B2 | 5/2019 | Tomoda |
| 10,965,201 | B2 * | 3/2021 | Ota ....................... B65G 43/00 |
| 2015/0348744 | A1 | 12/2015 | Uchida |
| 2016/0355350 | A1 | 12/2016 | Yamamoto |
| 2017/0117829 | A1 | 4/2017 | Yamamoto |
| 2018/0334338 | A1 | 11/2018 | Yamamoto |
| 2019/0092572 | A1 | 3/2019 | Fujii |
| 2019/0092578 | A1 | 3/2019 | Umeyama |
| 2019/0097515 | A1 | 3/2019 | Ota |
| 2019/0344967 | A1 | 11/2019 | Tomoda |

FOREIGN PATENT DOCUMENTS

| | | |
|---|---|---|
| CN | 102480210 A | 5/2012 |
| CN | 105452812 A | 3/2016 |
| CN | 107005138 A | 8/2017 |
| EP | 1850370 A1 | 10/2007 |
| JP | 2007-53825 A | 3/2007 |
| JP | 2008-199727 A | 8/2008 |
| JP | 2013-99039 A | 5/2013 |
| JP | 2015-230927 A | 12/2015 |
| JP | 105703600 A | 6/2016 |
| JP | 2016-532308 A | 10/2016 |
| KR | 2015-0044107 A | 4/2015 |
| WO | 2006-075575 A1 | 7/2006 |
| WO | 2015/056847 A1 | 4/2015 |

OTHER PUBLICATIONS

Korean Office Action dated May 25, 2022 in related Korean application No. 10-2019-0090676 (English-language translation not available.).

Japanese Search Report dated Apr. 8, 2021 in corresponding Japanese Application No. 2018-231005 (Translation Included) Copy provided in parent application.

Chinese Office Action dated Dec. 2, 2021 during prosecution of related Japanese application No. 2019-10716617.6 (English-language translation not included.) Copy provided in parent application.

Mei-yu Zhang et al., Research on Control Strategy of the Maximum Thrust of Permanent Magnet Linear Synchronous Motor, College of Information Engineering, Journal of Zhejiang University of Technology, vol. 31, No. 4, Aug. 28, 2003, pp. 1-14. (English-language abstract included.) Copy provided in parent application.

* cited by examiner

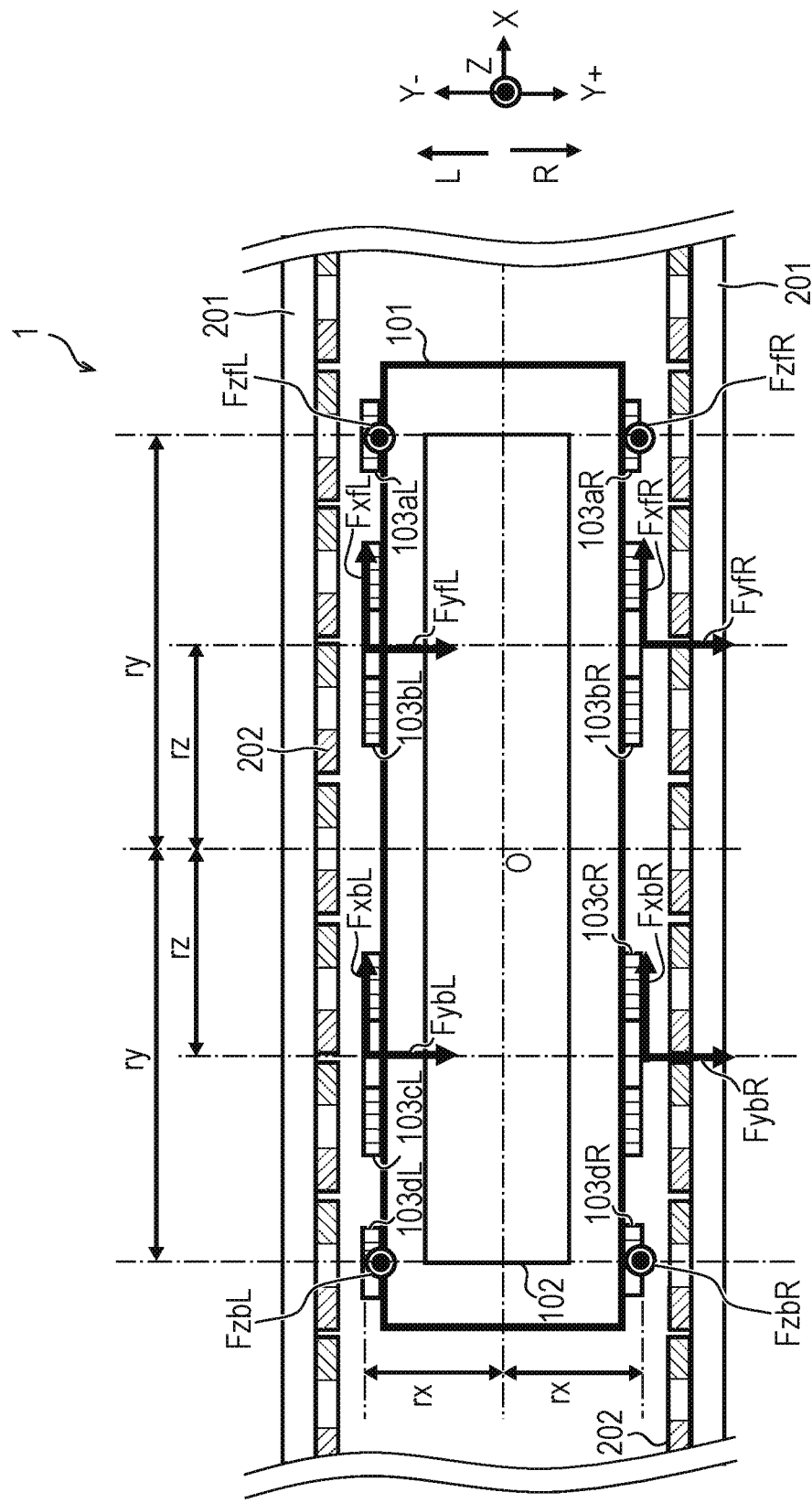

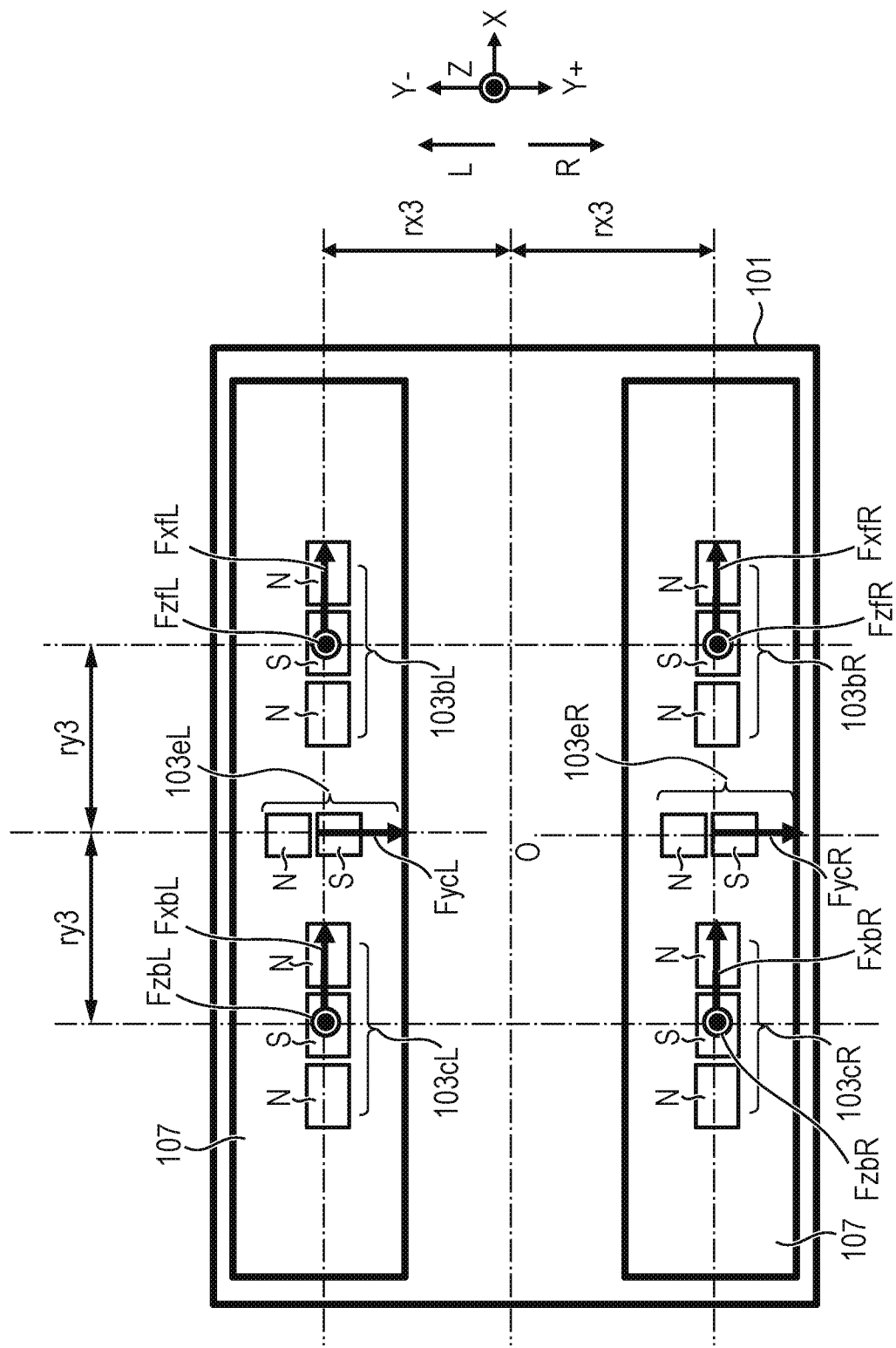

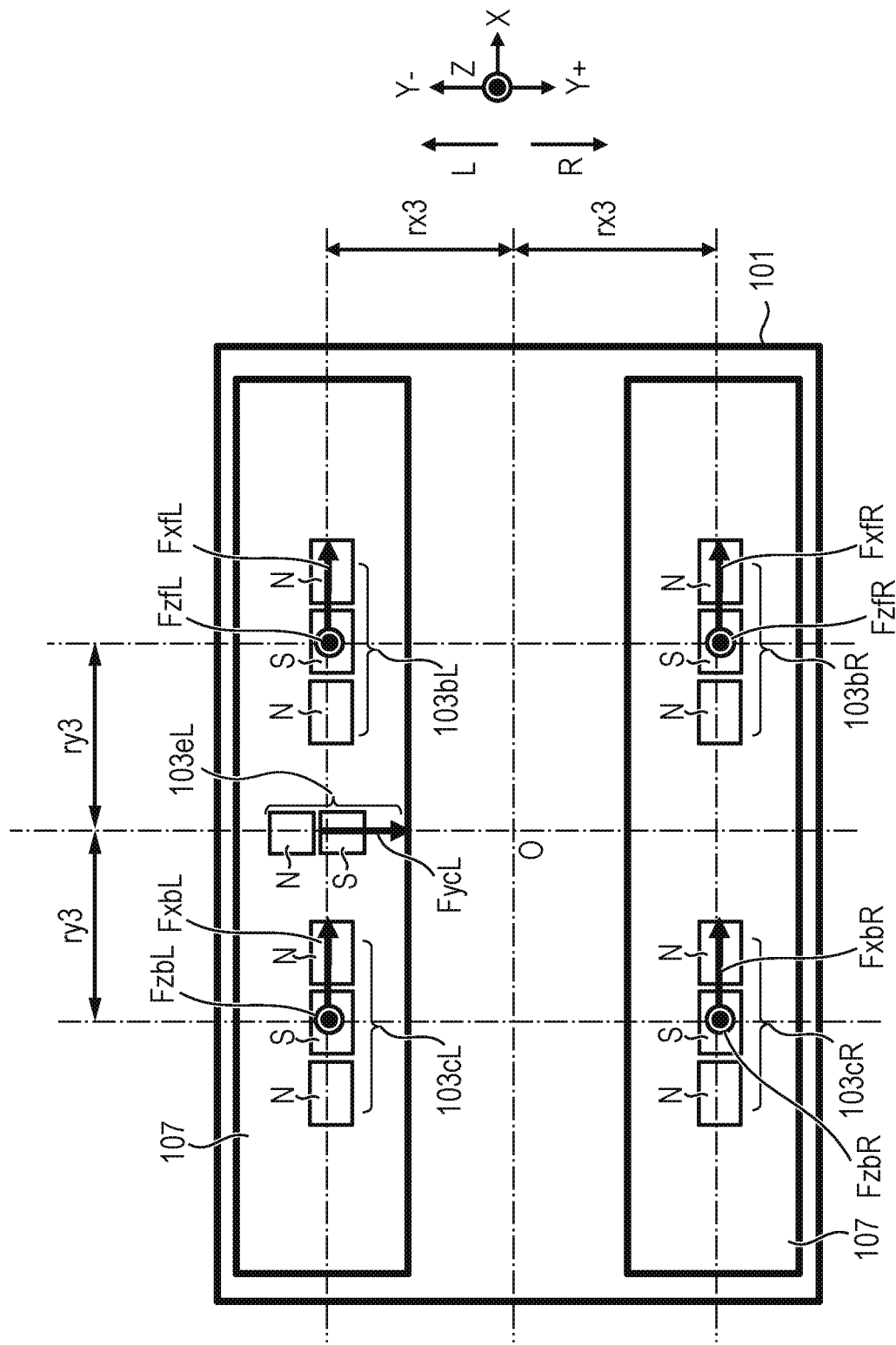

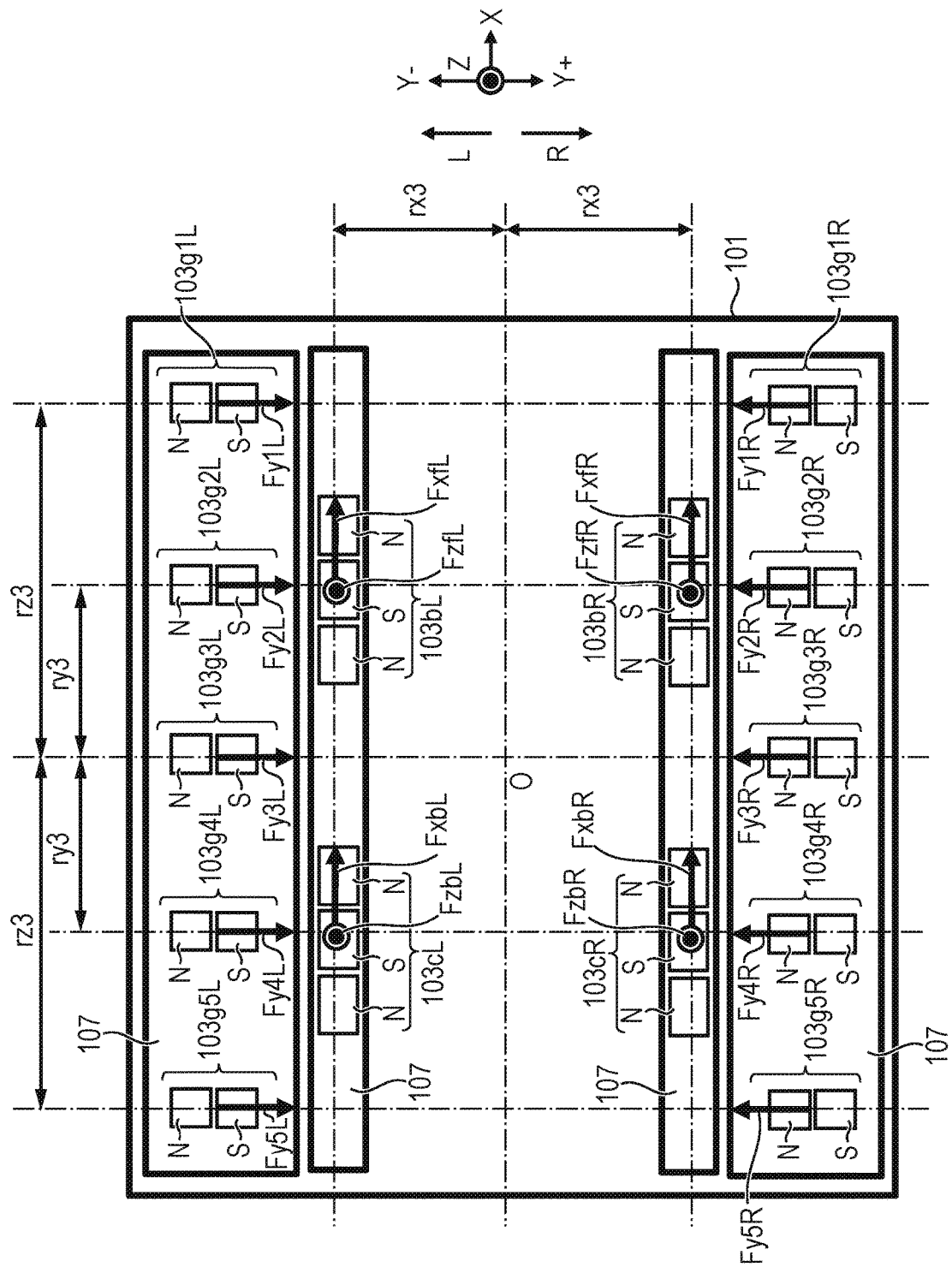

TRANSPORT SYSTEM, MOVER, CONTROL APPARATUS, AND CONTROL METHOD

This application is a continuation of U.S. application Ser. No. 17/164,537, filed on Feb. 1, 2021, which is a continuation of U.S. application Ser. No. 16/531,684, filed on Aug. 5, 2019 (now U.S. Pat. No. 10,944,314, issued on Mar. 9, 2021).

BACKGROUND OF THE INVENTION

Field of the Invention

The present invention relates to a transport system, a mover, a control apparatus, and a control method.

Description of the Related Art

In general, a transport system is used in production lines, semiconductor exposure apparatuses, or the like for assembling industrial products. In particular, a transport system in a production line transports workpieces such as components between a plurality of stations within a production line or between production lines that are factory-automated or may be used as a transport apparatus in a process apparatus. As a transport system, a transport system with a movable magnet type linear motor has already been proposed.

A transport system with a movable magnet type linear motor is formed by using a guide apparatus such as a linear guide involving mechanical contact. In a transport system using a guide apparatus such as a linear guide, however, there is a problem of degeneration of productivity caused by a contamination substance issued from a sliding portion of the linear guide, for example, scrapers of a rail or a bearing, a lubricant oil, a volatilized component thereof, or the like. Further, there is a problem of increased friction of a sliding portion during high speed transportation, which reduces the life of the linear guide.

Accordingly, Japanese Patent Application Laid-Open No. 2015-230927 and Japanese Patent Application Laid-Open No. 2016-532308 disclose non-contact magnetic levitation type motion apparatus or transport apparatus with no sliding portion as a guide. In a motion apparatus disclosed in Japanese Patent Application Laid-Open No. 2015-230927, seven lines of linear motors are installed for controlling transportation and attitude of a mover. Further, also in the transport apparatus disclosed in Japanese Patent Application Laid-Open No. 2016-532308, six lines of electromagnets for levitation, electromagnets for guiding, and electromagnets for propulsion are installed.

In the apparatuses disclosed in Japanese Patent Application Laid-Open No. 2015-230927 and Japanese Patent Application Laid-Open No. 2016-532308, however, a large number of lines of installed linear motors or electromagnets makes it difficult to avoid increase in size of a system.

SUMMARY OF THE INVENTION

The present invention intends to provide a transport system, a mover, a control apparatus, and a control method that can transport a mover contactlessly while controlling the attitude of the mover without involving increase in size of a system configuration.

According to one aspect of the present invention, provided is a transport system including: a mover having a first magnet group arranged in parallel to a first direction and a second magnet group arranged in parallel to a second direction crossing the first direction; and a plurality of coils arranged in parallel to the first direction so as to be able to face the first magnet group and the second magnet group, and the mover is able to move in the first direction along the plurality of coils by electromagnetic force received by the first magnetic group from the plurality of coils while an attitude of the mover is controlled by electromagnetic force received by the first magnetic group or the second magnetic group from the plurality of coils.

According to another aspect of the present invention, provided is a mover including: a first magnet group arranged in parallel to a first direction; and a second magnet group arranged in parallel to a direction crossing the first direction, and the mover is able to move in the first direction along a plurality of coils by electromagnetic force received by the first magnetic group from the plurality of coils while an attitude of the mover is controlled by electromagnetic force received by the first magnetic group or the second magnetic group from the plurality of coils, and the plurality of coils are arranged in parallel to the first direction so as to be able to face the first magnet group and the second magnet group.

According to yet another aspect of the present invention, provided is a control apparatus that controls a mover having a first magnet group arranged in parallel to a first direction and a second magnet group arranged in parallel to a direction crossing the first direction, wherein the mover is able to move in the first direction along a plurality of coils by electromagnetic force received by the first magnetic group from the plurality of coils while an attitude of the mover is controlled by electromagnetic force received by the first magnetic group or the second magnetic group from the plurality of coils, and the plurality of coils are arranged in parallel to the first direction so as to be able to face the first magnet group and the second magnet group. The control apparatus includes: a transport control unit that controls transportation of the mover in the first direction by controlling electromagnetic force received by the first magnet group from the plurality of coils; and an attitude control unit that controls an attitude of the mover by controlling electromagnetic force received by the first magnetic group or the second magnetic group from the plurality of coils.

According to still another aspect of the present invention, provided is a control method that controls a mover having a first magnet group arranged in parallel to a first direction and a second magnet group arranged in parallel to a direction crossing the first direction, wherein the mover is able to move in the first direction along a plurality of coils by electromagnetic force received by the first magnetic group from the plurality of coils while an attitude of the mover is controlled by electromagnetic force received by the first magnetic group or the second magnetic group from the plurality of coils, and the plurality of coils are arranged in parallel to the first direction so as to be able to face the first magnet group and the second magnet group. The control method includes: controlling transportation of the mover in the first direction by controlling electromagnetic force received by the first magnet group from the plurality of coils; and controlling an attitude of the mover by controlling electromagnetic force received by the first magnetic group or the second magnetic group from the plurality of coils.

Further features of the present invention will become apparent from the following description of exemplary embodiments with reference to the attached drawings.

BRIEF DESCRIPTION OF THE DRAWINGS

FIG. 1A a schematic diagram illustrating the entire configuration of a transport system including a mover and a stator according to a first embodiment.

FIG. 14A is a schematic diagram illustrating a mover in a transport system according to a first modified example of the third embodiment.

FIG. 14B is a schematic diagram illustrating a mover in a transport system according to a second modified example of the third embodiment.

FIG. 14D is a schematic diagram illustrating a mover in a transport system according to a fourth modified example of the third embodiment.

DESCRIPTION OF THE EMBODIMENTS

First Embodiment

A first embodiment of the present invention will be described below with reference to the drawings, namely, by using FIG. 1A to FIG. 9.

Figure 1B:
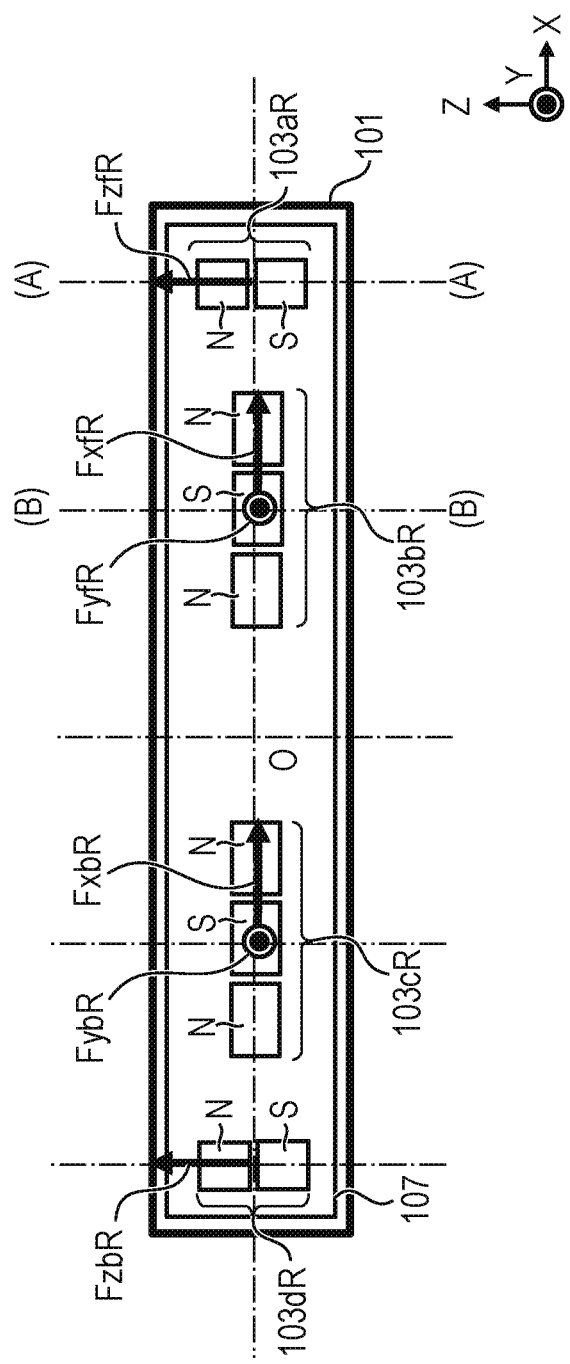
FIG. 1B is a schematic diagram illustrating the entire configuration of the transport system according to the first embodiment.

First, the entire configuration of a transport system according to the present embodiment will be described by using FIG. 1A and FIG. 1B. FIG. 1A and FIG. 1B are schematic diagrams illustrating the entire configuration of the transport system including a mover 101 and a stator 201 according to the present embodiment. Note that FIG. 1A and FIG. 1B illustrate extracted primary portions of the mover 101 and the stator 201. Further, FIG. 1A is a diagram of the mover 101 when viewed from the Z-direction described later, and FIG. 1B is a diagram of the mover 101 when viewed from the Y-direction described later.

As illustrated in FIG. 1A and FIG. 1B, a transport system 1 according to the present embodiment has the mover 101 forming a truck, a slider, or a carriage and the stator 201 forming a transport path. The transport system 1 is a transport system with a movable magnet type linear motor (a moving permanent magnet type linear motor, a movable field magnet type linear motor). Furthermore, the transport system 1 is configured as a magnetic levitation type transport system that has no guide apparatus such as a linear guide and transports the mover 101 contactlessly above the stator 201.

The transport system 1 transports a workpiece 102 on the mover 101 to a process apparatus that performs a processing operation on the workpiece 102 by transporting the mover 101 by the stator 201, for example. Note that, while FIG. 1A and FIG. 1B illustrate a single mover 101 for the stator 201, the number of movers 101 is not limited thereto. In the transport system 1, a plurality of movers 101 may be transported above the stator 201.

Here, coordinate axes, directions, and the like used in the description below are defined. First, the X-axis is taken along the horizontal direction, which is a transport direction of the mover 101, and the transport direction of the mover 101 is defined as the X-direction. Further, the Z-axis is taken along the vertical direction, which is a direction perpendicular to the X-direction, and the vertical direction is defined as the Z-direction. Further, the Y-axis is taken along a direction perpendicular to the X-direction and the Z-direction, and a direction perpendicular to the X-direction and the Z-direction is defined as the Y direction. Moreover, rotation about the X-axis is denoted as Wx, rotation about the Y-axis is denoted as Wy, and rotation about the Z-axis is denoted as Wz. Further, a symbol "*" is used as a symbol for multiplication. Further, the center of the mover 101 is denoted as the origin O, the positive (+) side of the Y-axis is denoted as an R-side, and the negative (−) side of the Y-axis is denoted as an L-side. Note that, while the transport direction of the mover 101 is not necessarily required to be the horizontal direction, also in such a case, the transportation direction may be defined as the X-direction, and the Y-direction and the Z-direction may be defined in a similar manner.

Figure 2:
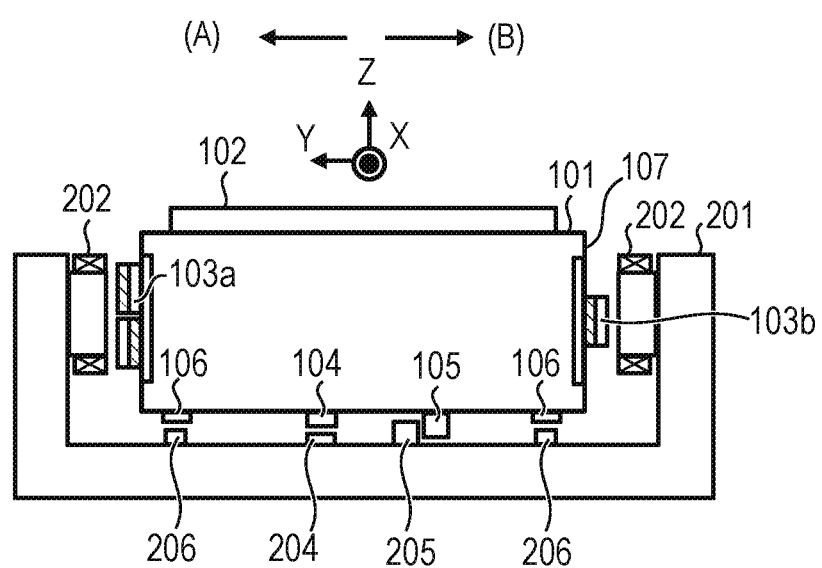
FIG. 2 is a schematic diagram illustrating the mover and the stator in the transport system according to the first embodiment.

Next, the mover 101 that is a transport object in the transport system 1 according to the present embodiment will be described by using FIG. 1A, FIG. 1B, and FIG. 2. FIG. 2 is a schematic diagram illustrating the mover 101 and the stator 201 in the transport system 1 according to the present embodiment. Note that FIG. 2 is a diagram of the mover 101 and the stator 201 when viewed from the X-direction. Further, the left half part of FIG. 2 illustrates a cross section (A) taken along a line (A)-(A) of FIG. 1B. Further, the right half part of FIG. 2 illustrates a cross section (B) taken along a line (B)-(B) of FIG. 1B.

As illustrated in FIG. 1A, FIG. 1B, and FIG. 2, the mover 101 has permanent magnets 103$a$R, 103$b$R, 103$c$R, 103$d$R, 103$a$L, 103$b$L, 103$c$L, and 103$d$L as permanent magnets 103.

The permanent magnets 103 are arranged and attached to both side faces of the mover 101 parallel to the X-direction. Specifically, the permanent magnets 103aR, 103bR, 103cR, and 103dR are attached on a side face on the R-side of the mover 101. Further, the permanent magnets 103aL, 103bL, 103cL, and 103dL are attached on a side face on the L-side of the mover 101. Note that, hereafter, the permanent magnets of the mover 101 are simply denoted as "permanent magnet(s) 103" as long as they are not required to be distinguished in particular. Further, when each permanent magnet 103 is required to be identified individually while the R-side and the L-side are not required to be distinguished, each permanent magnet 103 is individually identified by using a reference in which R or L is removed from the tail of a reference corresponding to each permanent magnet 103 and the reference characters up to a small-letter alphabet as an identifier are left. In this case, "permanent magnet 103a", "permanent magnet 103b", "permanent magnet 103c", or "permanent magnet 103d" is denoted to individually identify each permanent magnet 103.

The permanent magnets 103aR and 103dR are attached to one end and the other end in the X-direction on the side face on the R-side parallel to the X-direction of the mover 101. The permanent magnet 103bR and 103cR are attached between the permanent magnets 103aR and 103dR on the side face on the R-side of the mover 101. The permanent magnets 103aR, 103bR, 103cR, and 103dR are arranged at the equal pitch in the X-direction, for example. Further, the permanent magnets 103aR, 103bR, 103cR, and 103dR are arranged such that respective centers thereof are aligned straight in parallel to the X-direction running the center of the side face on the R-side of the mover 101, for example.

The permanent magnets 103aL and 103dL are attached to one end and the other end in the X-direction on the side face on the L-side parallel to the X-direction of the mover 101. The permanent magnet 103bL and 103cL are attached between the permanent magnets 103aL and 103dL on the side face on the L-side of the mover 101. The permanent magnets 103aL, 103bL, 103cL, and 103dL are arranged at the equal pitch in the X-direction, for example. Further, the permanent magnets 103aL, 103bL, 103cL, and 103dL are arranged such that respective centers thereof are aligned straight in parallel to the X-direction running the center of the side face on the L-side of the mover 101, for example. Moreover, the permanent magnets 103aL, 103bL, 103cL, and 103dL are arranged to the same positions as the permanent magnets 103aR, 103bR, 103cR, and 103dR in the X-direction, respectively.

The permanent magnets 103a and 103d are attached at positions that are distant from the origin O, which is the center of the mover 101, by a distance ry on one side and the other side in the X-direction, respectively. The permanent magnets 103a, 103b, 103c, and 103d are attached at positions that are distant from the origin O by a distance rx in the Y-direction, respectively. The permanent magnets 103c and 103b are attached to positions that are distant from the origin O by a distance rz on one side and the other side in the X-direction, respectively.

Each of the permanent magnets 103aR, 103dR, 103aL, and 103dL is a set of two permanent magnets arranged in parallel to the Z-direction. The permanent magnets 103a and 103d are formed, respectively, such that two permanent magnets are aligned in parallel to the Z-direction so that the polarities of outer magnetic poles facing the stator 201 side are different alternatingly. Note that the number of permanent magnets arranged in parallel to the Z-direction forming the permanent magnets 103a and 103d is not limited to two as long as it is plural. Further, the direction in which the permanent magnets forming the permanent magnets 103a and 103d are arranged is not necessarily required to be the Z-direction orthogonal to the X-direction that is the transport direction but may be a direction crossing the X-direction. That is, the permanent magnets 103a and 103d may be any magnet group formed of a plurality of permanent magnets arranged in parallel to a direction crossing the X-direction such that the polarities of respective magnetic polarities are alternating.

On the other hand, each of the permanent magnets 103bR, 103cR, 103bL, and 103cL is a set of three permanent magnets arranged along the Y-direction, respectively. The permanent magnets 103b and 103c are formed, respectively, such that three permanent magnets are aligned in parallel to the X-direction so that the polarities of outer magnetic poles facing the stator 201 side are different alternatingly. Note that the number of permanent magnets arranged in parallel to the X-direction forming the permanent magnets 103b and 103c is not limited to three as long as it is plural. That is, the permanent magnets 103b and 103c may be any magnet group formed of a plurality of permanent magnets arranged in parallel to the X-direction such that the polarities of respective magnetic polarities are alternating.

Respective permanent magnets 103 are attached to yokes 107 provided on the side faces on the R-side and the L-side of the mover 101. The yoke 107 is made of a substance having a large magnetic permeability, for example, an iron.

In such a way, a plurality of permanent magnets 103 are arranged to the mover 101 symmetrically on the side faces on the R-side and the L-side with the center axis along the X-axis of the mover 101 being a symmetry axis. The mover 101 on which the permanent magnets 103 are arranged is configured to be movable while the attitude is subjected to six-axis control by electromagnetic force received by the permanent magnets 103 from a plurality of coils 202 of the stator 201 as described later.

The mover 101 is movable in the X-direction along the plurality of coils 202 arranged in two lines parallel to the X-direction. The mover 101 is transported with the workpiece 102 to be transported being placed on the upper face thereof. The mover 101 may have a holding mechanism that holds the workpiece 102 such as a workpiece holder on the mover 101, for example.

Figure 3:
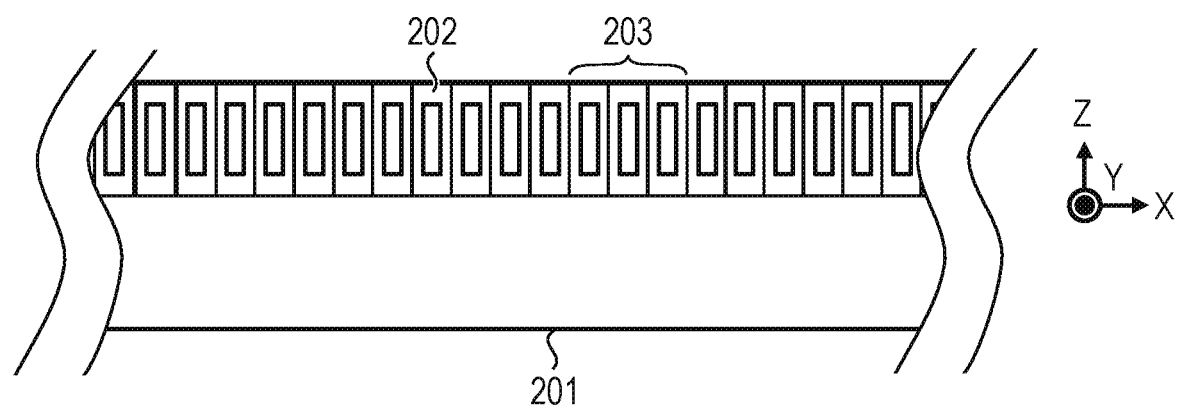
FIG. 3 is a schematic diagram illustrating a coil of the stator in the transport system according to the first embodiment.

Next, the stator 201 in the transport system 1 according to the present embodiment will be described by using FIG. 1A, FIG. 2, and FIG. 3. FIG. 3 is a schematic diagram illustrating the coils 202 of the stator 201. Note that FIG. 3 is a diagram of the coils 202 when viewed from the Y-direction.

The stator 201 has the plurality of coils 202 arranged in two lines parallel to the X-direction that is the transport direction of the mover 101. The plurality of coils 202 are attached to the stator 201 so as to face the mover 101 from the R-side and the L-side, respectively. The stator 201 extends in the X-direction, which is the transport direction, and forms a transport path of the mover 101.

The mover 101 transported on the stator 201 has a linear scale 104, a Y-target 105, and Z-targets 106. The linear scale 104, the Y-target 105, and the Z-targets 106 are attached in parallel to the X-direction to the bottom of the mover 101, for example, respectively. The Z-targets 106 are attached on both sides of the linear scale 104 and the Y-target 105, respectively.

As illustrated in FIG. 2, the stator 201 has the plurality of coils 202, a plurality of linear encoders 204, a plurality of Y-sensors 205, and a plurality of Z-sensors 206.

The plurality of coils 202 are arranged in two lines parallel to the X-direction and attached to the stator 201 so as to be able to face the permanent magnets 103 on the side faces on the R-side and the L-side of the mover 101. The plurality of coils 202 arranged in one line on the R-side are arranged in parallel to the X-direction so as to be able to face the permanent magnets 103aR, 103bR, 103cR, and 103dR on the R-side of the mover 101. Further, the plurality of coils 202 arranged in one line on the L-side are arranged in parallel to the X-direction so as to be able to face the permanent magnets 103aL, 103bL, 103cL, and 103dL on the L-side of the mover 101.

In the present embodiment, lines of the coils 202 on the R-side and the L-side of the mover 101 are arranged so as to be able to face the permanent magnets 103a and 103d and the permanent magnets 103b and 103c, respectively, in which arrangement directions of the plurality of permanent magnets are different between the permanent magnets 103a and 103d and the permanent magnets 103b and 103c. Thus, force in the transport direction and force in a direction different from the transport direction can be applied to the mover 101 by using a fewer lines of coils 202 as described later, and therefore transport control and attitude control of the mover 101 can be realized.

In such a way, the plurality of coils 202 are attached along a direction in which the mover 101 is transported. The plurality of coils 202 are aligned at predetermined intervals in the X-direction. Further, each of the coils 202 is attached such that the center axis thereof is oriented in the Y-direction. Note that the coil 202 may be a coil with a core or may be a coreless coil.

The plurality of coils 202 are configured to be current-controlled in a unit of three coils, for example. The unit in which current conduction control is performed on the coils 202 is referred to as "coil unit 203". When a current is conducted, the coil 202 can generate electromagnetic force with respect to the permanent magnets 103 of the mover 101 and apply force to the mover 101.

In FIG. 1A and FIG. 1B, the permanent magnets 103a and 103d are each formed of a magnet group in which two permanent magnets are aligned in the Z-direction. In contrast, each coil 202 is arranged such that the center in the Z-direction of two permanent magnets of the permanent magnets 103a and 103d matches the center in the Z-direction of the coil 202. Current conduction in the coils 202 facing the permanent magnets 103a and 103d generates force in the Z-direction to the permanent magnets 103a and 103d.

Further, the permanent magnets 103b and 103c are formed of a magnet group in which three permanent magnets are aligned in the X-direction. In contrast, current conduction in the coils 202 facing the permanent magnets 103b and 103c generates force in the X-direction and the Y-direction to the permanent magnets 103b and 103c.

The plurality of linear encoders 204 are attached to the stator 201 parallel to the X-direction so as to be able to face the linear scale 104 of the mover 101, respectively. Each of the linear encoders 204 can detect and output a relative position to the linear encoder 204 of the mover 101 by reading the linear scale 104 attached to the mover 101.

The plurality of Y-sensors 205 are attached to the stator 201 parallel to the X-direction so as to be able to face the Y-target 105 of the mover 101, respectively. Each of the Y-sensors 205 can detect and output the relative distance in the Y-direction between the Y-sensor 205 and the Y-target 105 attached to the mover 101.

The plurality of Z-sensors 206 are attached to the stator 201 in two lines parallel to the X-direction so as to be able to face the Z-target 106 of the mover 101, respectively. Each of the Z-sensors 206 can detect and output the relative distance in the Z-direction between the Z-sensor 206 and the Z-target 106 attached to the mover 101.

Figure 4:
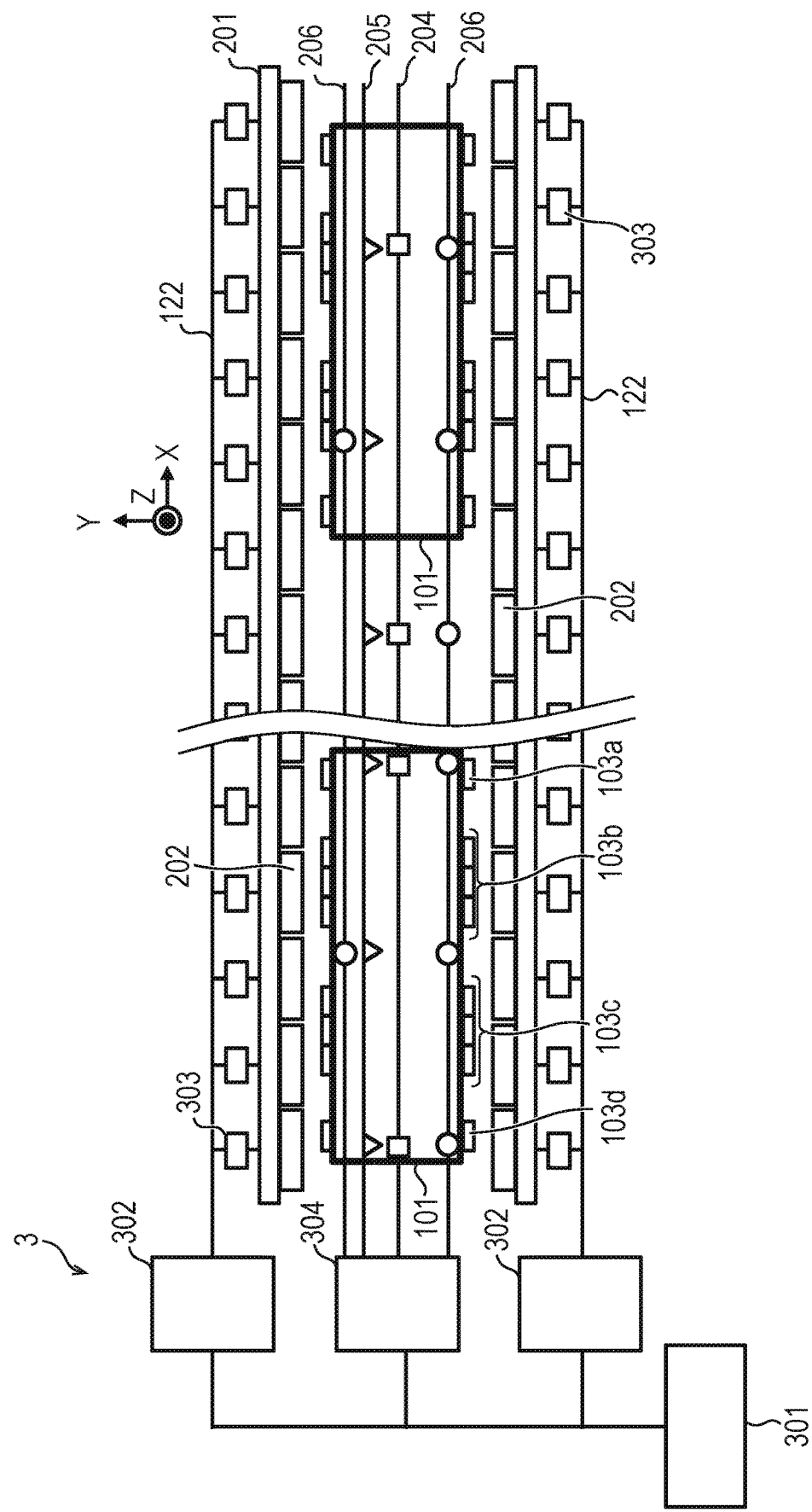
FIG. 4 is a schematic diagram illustrating a control system that controls the transport system according to the first embodiment.

Next, a control system that controls the transport system 1 according to the present embodiment will be further described by using FIG. 4. FIG. 4 is a schematic diagram illustrating a control system 3 that controls the transport system 1 according to the present embodiment.

As illustrated in FIG. 4, the control system 3 has an integration controller 301, coil controllers 302, and a sensor controller 304 and functions as a control apparatus that controls the transport system 1 including the mover 101 and the stator 201. The coil controllers 302 are communicably connected to the integration controller 301. Further, the sensor controller 304 is communicably connected to the integration controller 301.

A plurality of current controllers 303 are communicably connected to the coil controllers 302. Each of the coil controllers 302 and the plurality of current controllers 303 connected thereto are provided to the corresponding line of two lines of the coils 202. The coil unit 203 is connected to each of the current controllers 303. The current controller 303 can control a current value of each of the coils 202 of the connected coil unit 203.

The coil controller 302 instructs a target current value to each of the connected current controllers 303. The current controller 303 controls a current amount of the connected coil 202.

The coil 202 and the current controller 303 are attached on both sides in the X-direction in which the mover 101 is transported.

The plurality of linear encoders 204, the plurality of Y-sensors 205, and the plurality of Z-sensors 206 are communicably connected to the sensor controller 304.

The plurality of linear encoders 204 are attached to the stator 201 at intervals by which one of the linear encoders 204 can surely measure the position of one mover 101 during transportation of the movers 101. Further, the plurality of Y-sensors 205 are attached to the stator 201 at intervals by which two of the Y-sensors 205 can surely measure the Y-target 105 of one mover 101. Further, the plurality of Z-sensors 206 are attached to the stator 201 at intervals by which three of the Z-sensors 206 on the two lines can surely measure the Z-target 106 of one mover 101.

The integration controller 301 determines a current instruction value applied to the plurality of coils 202 based on the output from the linear encoders 204, the Y-sensors 205, and the Z-sensors 206 and transmits the determined current instruction value to the coil controllers 302. The coil controller 302 instructs the current controller 303 of a current value as described above based on the current instruction value from the integration controller 301. Thereby, the integration controller 301 functions as a control apparatus, transports the mover 101 contactlessly above the stator 201, and controls the attitude of the transported mover 101 with respect to six axes.

Figure 5:
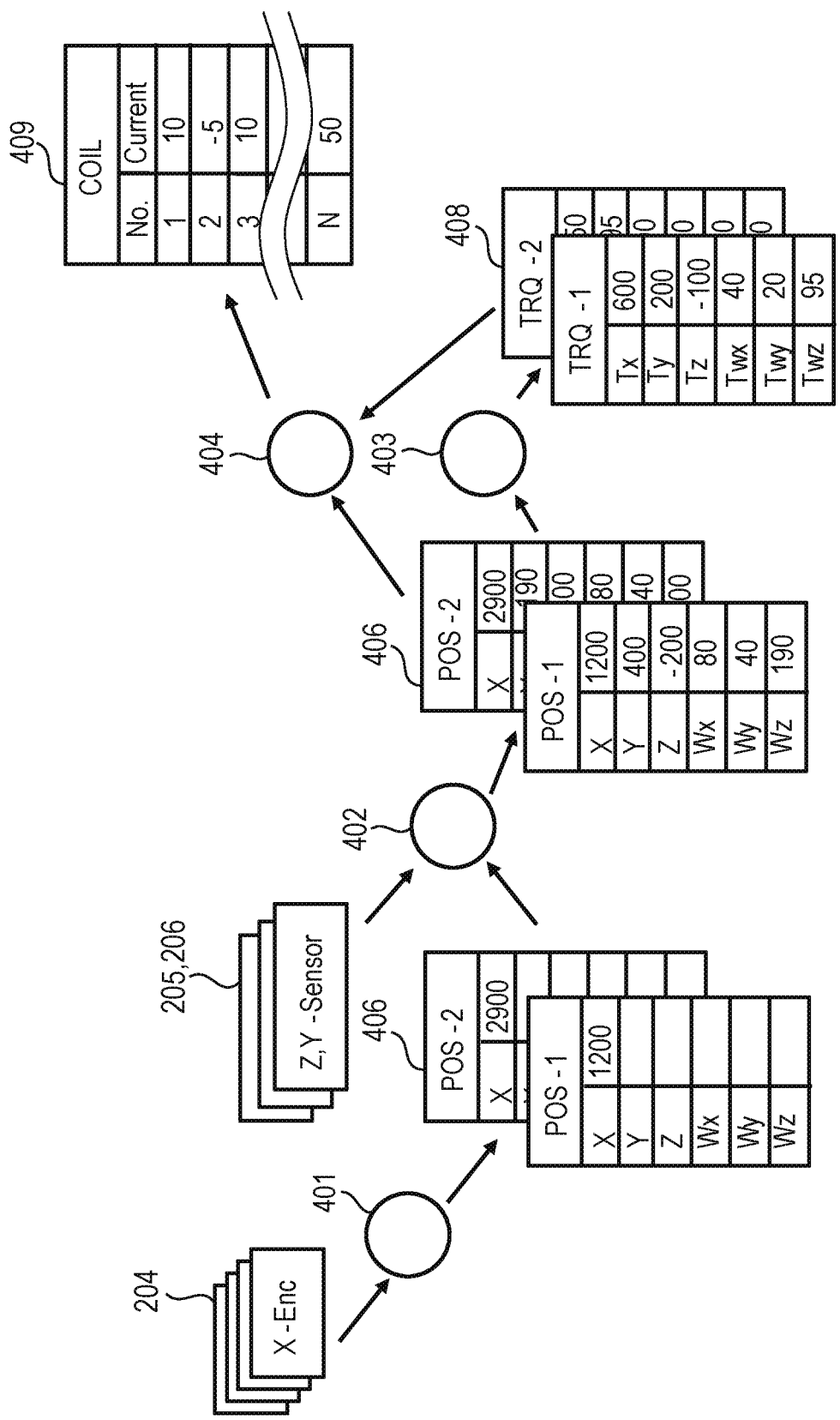
FIG. 5 is a schematic diagram illustrating an attitude control method of the mover in the transport system according to the first embodiment.

An attitude control method of the mover 101 performed by the integration controller 301 will be described below by using FIG. 5. FIG. 5 is a schematic diagram illustrating the attitude control method of the mover 101 in the transport system 1 according to the present embodiment. FIG. 5 illustrates the outline of the attitude control method of the mover 101 in which the data flow thereof is mainly focused on. The integration controller 301 performs a process using a mover position calculation function 401, a mover attitude calculation function 402, a mover attitude control function 403, and a coil current calculation function 404, as described below. Thereby, the integration controller 301 controls transportation of the mover 101 while controlling the attitude of the mover 101 with respect to six axes. Note that, instead of the integration controller 301, the coil controller 302 may be configured to perform the same process as that performed by the integration controller 301.

First, the mover position calculation function 401 calculates the number and the position of the movers 101 above the stator 201 forming the transport path from measurement values from the plurality of linear encoders 204 and information on the attachment position thereof. Thereby, the mover position calculation function 401 updates mover position information (X) and number information in mover information 406 that is information on the movers 101. The mover position information (X) illustrates a position in the X-direction, which is the transport direction of the movers 101 above the stator 201. The mover information 406 is prepared for each mover 101 above the stator 201, as illustrated as POS-1, POS-2, . . . in FIG. 5, for example.

Next, the mover attitude calculation function 402 identifies the Y-sensor 205 and the Z-sensor 206 that can measure each of the movers 101 from the mover position information (X) in the mover information 406 updated by the mover position calculation function 401. Next, the mover attitude calculation function 402 calculates attitude information (Y, Z, Wx, Wy, Wz), which is information on the attitude of each of the movers 101, based on the values output from the identified Y-sensor 205 and Z-sensor 206 and updates the mover information 406. The mover information 406 updated by the mover attitude calculation function 402 includes the mover position information (X) and the attitude information (Y, Z, Wx, Wy, Wz).

Next, the mover attitude control function 403 calculates application force information 408 for each of the movers 101 from the current mover information 406 including the mover position information (X) and the attitude information (Y, Z, Wx, Wy, Wz) and an attitude target value. The application force information 408 is information on the magnitude of force to be applied to each of the movers 101. The application force information 408 includes information on three-axis force components (Tx, Ty, Tz) and three-axis moment components (Twx, Twy, Twz) of force T to be applied described later. The application force information 408 is prepared for each mover 101 above the stator 201 as illustrated as TRQ-1, TRQ-2, . . . in FIG. 5, for example.

Next, the coil current calculation function 404 determines a current instruction value 409 applied to each coil 202 based on the application force information 408 and the mover information 406.

In such a way, the integration controller 301 determines the current instruction value 409 by performing a process using the mover position calculation function 401, the mover attitude calculation function 402, the mover attitude control function 403, and the coil current calculation function 404. The integration controller 301 transmits the determined current instruction value 409 to the coil controllers 302.

Figure 6:
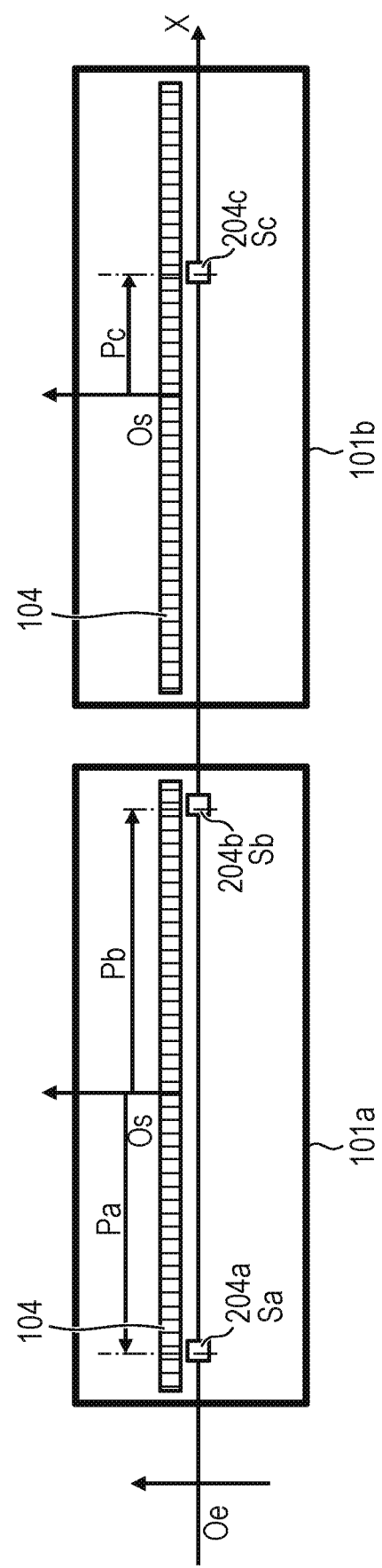
FIG. 6 is a schematic diagram illustrating a process by using a mover position calculation function in the transport system according to the first embodiment.

The process performed by the mover position calculation function 401 will now be described by using FIG. 6. FIG. 6 is a schematic diagram illustrating a process according to the mover position calculation function.

In FIG. 6, the reference point Oe is the position reference of the stator 201 to which the linear encoder 204 is attached. Further, the reference point Os is the position reference of the linear scale 104 attached to the mover 101. FIG. 6 illustrates a case where two movers 101a and 101b as the movers 101 are transported and three linear encoders 204a, 204b, and 204c are arranged as the linear encoders 204. Note that the linear scale 104 is attached in parallel to the X-direction at the same position as each of the movers 101a and 101b.

For example, one linear encoder 204c faces the linear scale 104 of the mover 101b illustrated in FIG. 6. The linear encoder 204c reads the linear scale 104 of the mover 101b and outputs a distance Pc. Further, the position of the linear encoder 204c on the X-axis whose origin is the reference point Oe is denoted as Sc. Therefore, the position Pos(101b) of the mover 101b can be calculated by Equation (1) below.

$$Pos(101b) = Sc - Pc \qquad \text{Equation (1)}$$

For example, two linear encoders 204a and 204b face the linear scale 104 of the mover 101a illustrated in FIG. 6. The linear encoder 204a reads the linear scale 104 of the mover 101a and outputs a distance Pa. Further, the position of the linear encoder 204a on the X-axis whose origin is the reference point Oe is denoted as Sa. Therefore, the position Pos(101a) on the X-axis of the mover 101a based on the output of the linear encoder 204a can be calculated by Equation (2) below.

$$Pos(101a) = Sa - Pa \qquad \text{Equation (2)}$$

Further, the linear encoder 204b reads the linear scale 104 of the mover 101b and outputs a distance Pb. Further, the position of the linear encoder 204b on the X-axis whose origin is the reference point Oe is denoted as Sb. Therefore, the position Pos(101a)' on the X-axis of the mover 101a based on the output of the linear encoder 204b can be calculated by Equation (3) below.

$$Pos(101a)' = Sb - Pb \qquad \text{Equation (3)}$$

Here, since each of the positions of the linear encoders 204a and 204b has been measured accurately in advance, the difference between two values Pos(101a) and Pos(101a)' is sufficiently small. When the difference in position on the X-axis of the mover 101 based on the output of the two linear encoders 204 is sufficiently small in such a way, these two linear encoders 204 can determine that the linear scale 104 of the same mover 101 is observed.

Note that, when the plurality of linear encoders 204 face the same mover 101, the position of the observed mover 101 can be uniquely determined by calculating an averaged value of positions based on the output of the plurality of linear encoders 204 or the like.

The mover position calculation function 401 calculates and determines the position X in the X-direction of the mover 101 as mover position information based on the output of the linear encoder 204 as described above.

Next, the process by the mover attitude calculation function 402 will be described by using FIG. 7, FIG. 8A, and FIG. 8B.

Figure 7:
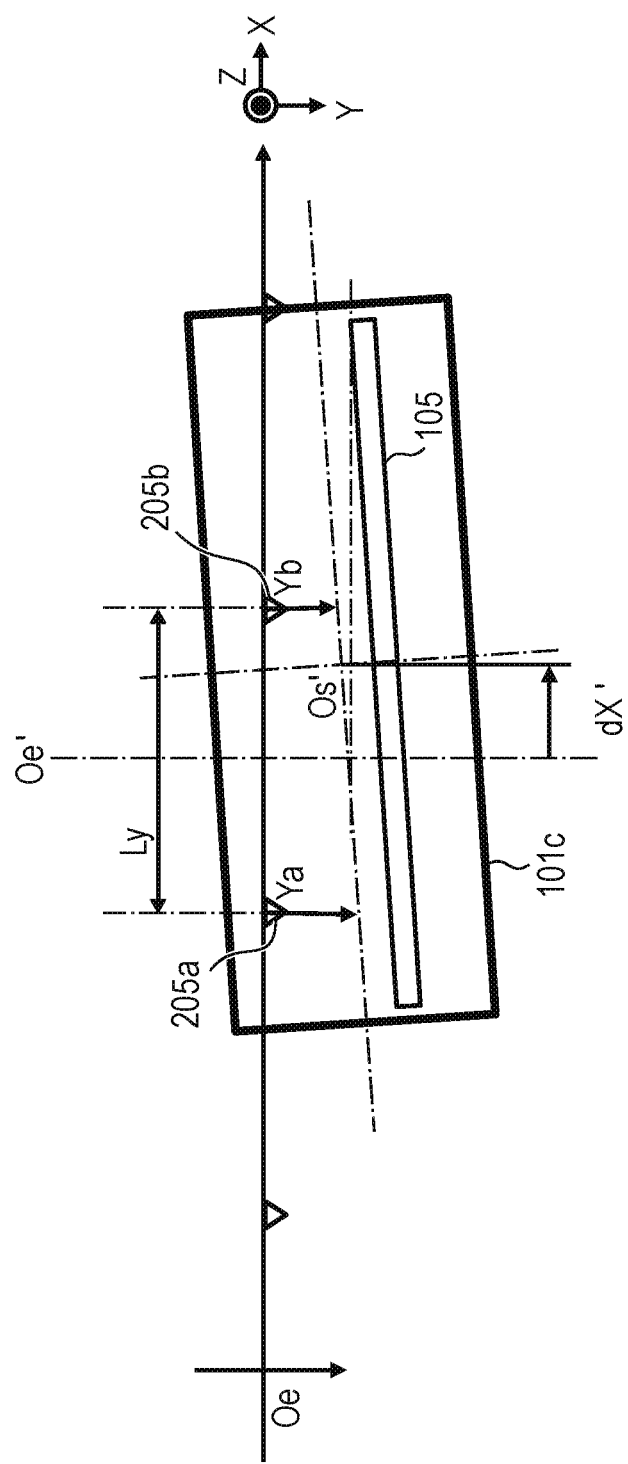
FIG. 7 is a schematic diagram illustrating a process by using a mover attitude calculation function in the transport system according to the first embodiment.

FIG. 7 illustrates a case where the mover 101c as the mover 101 is transported and the Y-sensors 205a and 205b as the Y-sensors 205 are arranged. The two Y-sensors 205a and 205b face the Y-target 105 of the mover 101c illustrated in FIG. 7. When the relative distance values output by the two Y-sensors 205a and 205b are denoted as Ya and Yb, respectively, and the interval between the Y-sensors 205a and 205b is denoted as Ly, the rotation amount Wz around the Z-axis of the mover 101c is calculated by Equation (4) below.

$$Wz = (Ya - Yb)/Ly \qquad \text{Equation (4)}$$

Note that three or more Y-sensors 205 may face the Y-target 105 for a particular position of the mover 101. In such a case, the slope of the Y-target 105, that is, the rotation amount Wz around the Z-axis can be calculated by using a least-squares method.

Figure 8A:
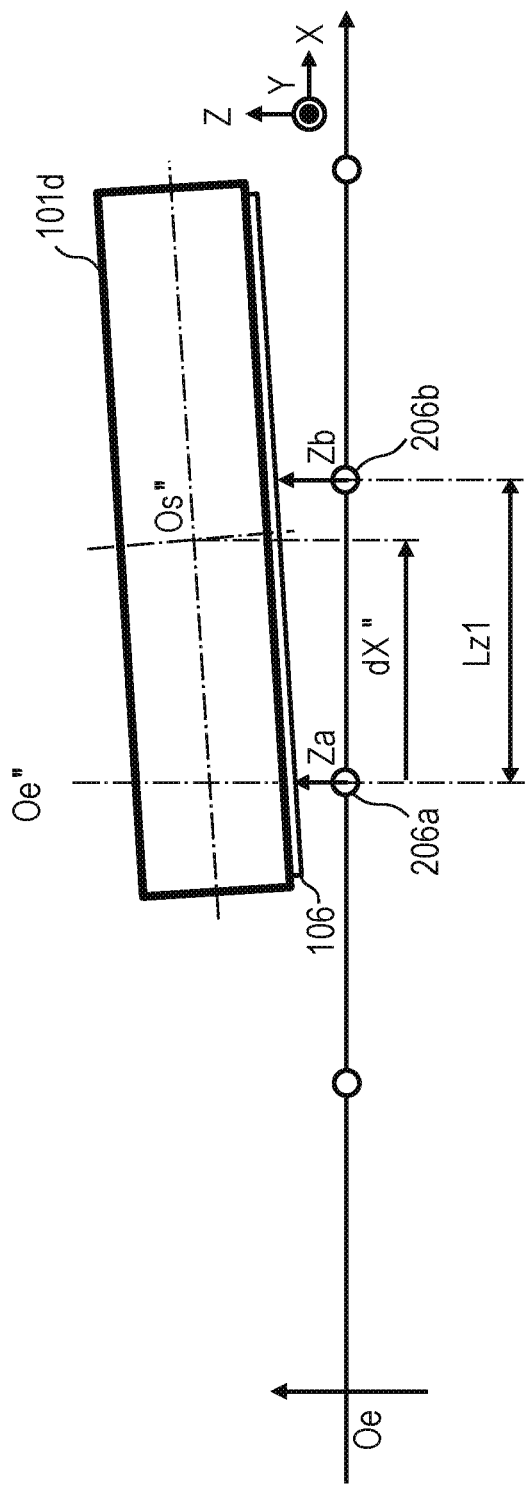
FIG. 8A is a schematic diagram illustrating a process by using the mover attitude calculation function in the transport system according to the first embodiment.
Figure 8B:
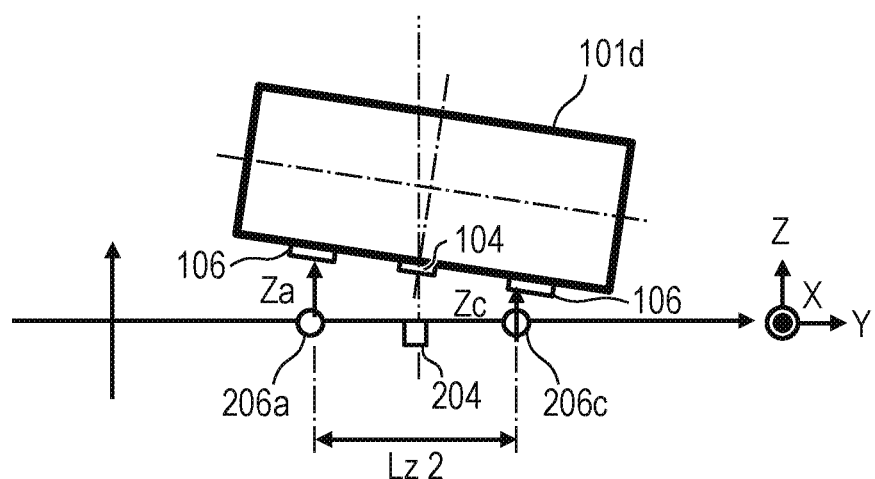
FIG. 8B is a schematic diagram illustrating a process by using the mover attitude calculation function in the transport system according to the first embodiment.

Further, in FIG. 8A and FIG. 8B illustrate a case where the mover 101d as the mover 101 is transported and the Z-sensors 206a, 206b, and 206c are arranged as the Z-sensors 206. Three Z-sensors 206a, 206b, and 206c face the Z-target 106 of the mover 101d illustrated in FIG. 8A and FIG. 8B. Here, the relative distance values output by three Z-sensors 206a, 206b, and 206c are denoted as Za, Zb, and Zc, respectively. Further, the distance between sensors in the X-direction, that is, the distance between the Z-sensors 206a and 206b is denoted as Lz1. Further, the distance between sensors in the Y-direction, that is, the distance between the Z-sensors 206a and 206c is denoted as Lz2. Then, the rotation amount Wy around the Y-axis and the rotation amount Wx around the X-axis can be calculated by Equations (5a) and (5b) below, respectively.

$$Wy = (Zb - Za)/Lz1 \qquad \text{Equation (5a)}$$
$$Wx = (Zc - Za)/Lz2 \qquad \text{Equation (5b)}$$

The mover attitude calculation function 402 can calculate the rotation amounts Wx, Wy, and Wz around respective axes as the attitude information on the mover 101, as described above.

Further, the mover attitude calculation function 402 can calculate the position Y in the Y-direction and the position Z in the Z-direction of the mover 101 as the attitude information on the mover 101 in the following manner.

First, calculation of the position Y in the Y-direction of the mover 101 will be described by using FIG. 7. In FIG. 7, two Y-sensors 205 covered by the mover 101c are the Y-sensor 205a and 205b, respectively. Further, the measurement values of the Y-sensors 205a and 205b are denoted as Ya and Yb, respectively. Further, the midpoint of the position of the Y-sensor 205a and the position of the Y-sensor 205b is denoted as denoted as Oe'. Moreover, the position of the mover 101c obtained by Equations (1) to (3) is denoted as Os', and the distance from Oe' to Os' is denoted as dX'. At this time, the position Y in the Y-direction of the mover 101c can be calculated by approximation using the following equation.

$$Y = (Ya + Yb)/2 - Wz * dX'$$

Next, calculation of the position Z in the Z-direction of the mover 101 will be described by using FIG. 8A and FIG. 8B. Three Z-sensors 206 covered by the mover 101d are denoted as the Z-sensors 206a, 206b, and 206c, respectively. Further, the measurement values of the Z-sensors 206a, 206b, and 206c are denoted as Za, Zb, and Zc, respectively. Further, the X-coordinate of the Z-sensor 206a and the X-coordinate of the Z-sensor 206c are the same. Further, the linear encoder 204 is located in the middle of the Z-sensor 206a and the Z-sensor 206c. Further, the position X of the Z-sensor 206a and the Z-sensor 206c is denoted as Oe". Moreover, the distance from Oe" to the center Os" of the mover 101 is denoted as dX". At this time, the position Z in the Z-direction of the mover 101 can be calculated by approximation using the following equation.

$$Z = (Za + Zb)/2 - Wy * dX''$$

Note that, when both the position Y and the position Z have large rotation amounts of Wz and Wy, respectively, the accuracy of approximation can be further increased for calculation.

Next, the process by the coil current calculation function 404 will be described by using FIG. 1A and FIG. 1B. Note that, in denotation of force used below, directions in which force in the X-direction, force in the Y-direction, and force in the Z-direction are denoted as x, y, and z, respectively, the R-side that is the positive (+) Y-side is denoted as R, the L-side that is the negative (−) Y-side is denoted as L, the positive (+) X-side is denoted as f, and the negative (−) X-direction is denoted as b in FIG. 1A and FIG. 1B.

Force components working on the permanent magnets 103 on the R-side and the L-side in FIG. 1A and FIG. 1B are expressed as below, respectively. Force working on each permanent magnet 103 is electromagnetic force received by the permanent magnet 103 from a plurality of coils 202 to which a current is applied. The permanent magnet 103 receives, from the plurality of coils 202 to which a current is applied, electromagnetic force in the X-direction that is the transport direction of the mover 101 and, in addition, electromagnetic force in the Y-direction and the Z-direction that are different from the X-direction.

Each force working on the permanent magnet 103 on the R-side is as below.

FzfR: force working in the Z-direction of the permanent magnet 103aR on the R-side FxfR: force working in the X-direction of the permanent magnet 103bR on the R-side FyfR: force working in the Y-direction of the permanent magnet 103bR on the R-side FxbR: force working in the X-direction of the permanent magnet 103cR on the R-side FybR: force working in the Y-direction of the permanent magnet 103cR on the R-side FzbR: force working in the Z-direction of the permanent magnet 103dR on the R-side Each force working on the permanent magnet 103 on the L-side is as below.

FzfL: force working in the Z-direction of the permanent magnet 103aL on the L-side FxfL: force working in the X-direction of the permanent magnet 103bL on the L-side FyfL: force working in the Y-direction of the permanent magnet 103bL on the L-side FxbL: force working in the X-direction of the permanent magnet 103cL on the L-side FybL: force working in the Y-direction of the permanent magnet 103cL on the L-side FzbL: force working in the Z-direction of the permanent magnet 103dL on the L-side Further, the force T applied to the mover 101 is expressed by Equation (6) below. Note that values Tx, Ty, and Tz are three-axis force components, which are an X-direction component, a Y-direction component, and a Z-direction component of the force, respectively. Further, values Twx, Twy, and Twz are three-axis moment components, which are a component around the X-axis, a component around the Y-axis, and a component around the Z-axis of moment, respectively. The transport system 1 according to the present embodiment controls transportation of the mover 101 while controlling the attitude of the mover 101 with respect to six axes by controlling these six-axis components of the force T (Tx, Ty, Tz, Twx, Twy, Twz).

$$T = (Tx, Ty, Tz, Twx, Twy, Twz) \quad \text{Equation (6)}$$

Accordingly, the values Tx, Ty, Tz, Twx, Twy, and Twz are calculated by Equations (7a), (7b), (7c), (7d), (7e), and (7f) below, respectively.

$$Tx = FxfR + FxbR + FxfL + FxbL \quad \text{Equation (7a)}$$

$$Ty = FyfL + FyfR + FybL + FybR \quad \text{Equation (7b)}$$

$$Tz = FzbR + FzbL + FzfR + FzfL \quad \text{Equation (7c)}$$

$$Twx = \{(FzfL + FzbL) - (FzfR + FzbR)\} * rx \quad \text{Equation (7d)}$$

$$Twy = \{(FzfL + FzfR) - (FzbL + FzbR)\} * ry \quad \text{Equation (7e)}$$

$$Twz = \{(FyfL + FyfR) - (FybL + FybR)\} * rz \quad \text{Equation (7f)}$$

At this time, restrictions expressed by Equations (7g), (7h), (7i), and (7j) below can be introduced for force working on the permanent magnet 103. By introducing these restrictions, it is possible to uniquely determine a combination of force components working on respective permanent magnets 103 to obtain the force T having predetermined six-axis components.

$$FxfR = FxbR = FxfL = FxbL \quad \text{Equation (7g)}$$

$$FyfL = FyfR \quad \text{Equation (7h)}$$

$$FybL = FybR \quad \text{Equation (7i)}$$

$$FzbR = FzbL \quad \text{Equation (7j)}$$

Next, a method by which the coil current calculation function 404 determines a current amount applied to each coil 202 from force working on each permanent magnet 103 will be described.

First, a case where force in the Z-direction is applied to the permanent magnets 103a and 103d where polarities of N-pole and S-pole are aligned alternatingly in the Z-direction will be described. Note that the coils 202 are arranged such that the centers thereof in the Z-direction are located at the centers in the Z-direction of the permanent magnets 103a and 103d. This causes substantially no force working in the X-direction and the Y-direction on the permanent magnets 103a and 103d.

The value X denotes the position of the mover 101, the value j denotes the number of one of the coils 202 aligned in a line, the magnitude of force working in the Z-direction of the coil 202(j) per unit current is denoted as Fz(j, X), and a current applied to the coil 202(j) is denoted as i(j). Note that the coil 202(j) is the j-th coil 202. In this case, the current i(j) can be determined to satisfy Equation (8) below. Note that Equation (8) below is an equation for the permanent magnet 103dR. Each current to be applied to the coil 202 can be determined for other permanent magnets 103aR, 103aL, and 103dL in the same manner.

$$\sum Fz(j, X) * i(j) = FzbR \quad \text{Equation (8)}$$

The coil current calculation function 404 can determine a current instruction value to be applied to the coil 202(j) as described above. The mover 101 obtains levitation force to levitate in the Z-direction, and the attitude thereof is controlled by the force in the Z-direction applied to the mover 101 in accordance with the current instruction value determined in such a way.

Note that, when the plurality of coils 202 apply force to the permanent magnets 103, a current is divided with respect to the magnitude of force per unit current in accordance with force applied by each coil 202, and thereby force working on the permanent magnet 103 can be uniquely determined.

Further, as illustrated in FIG. 1A, the permanent magnets 103 are arranged symmetrically on the L-side and the R-side of the mover 101. With such symmetry arrangement of the permanent magnets 103, it is possible to use the force on the L-side and the R-side to cancel multiple force components working on the permanent magnets 103, for example, the force of Wx working on the permanent magnets 103a and 103d, that is, the moment component around the X-axis. As a result, this enables more accurate control of the attitude of the mover 101.

Figure 9:
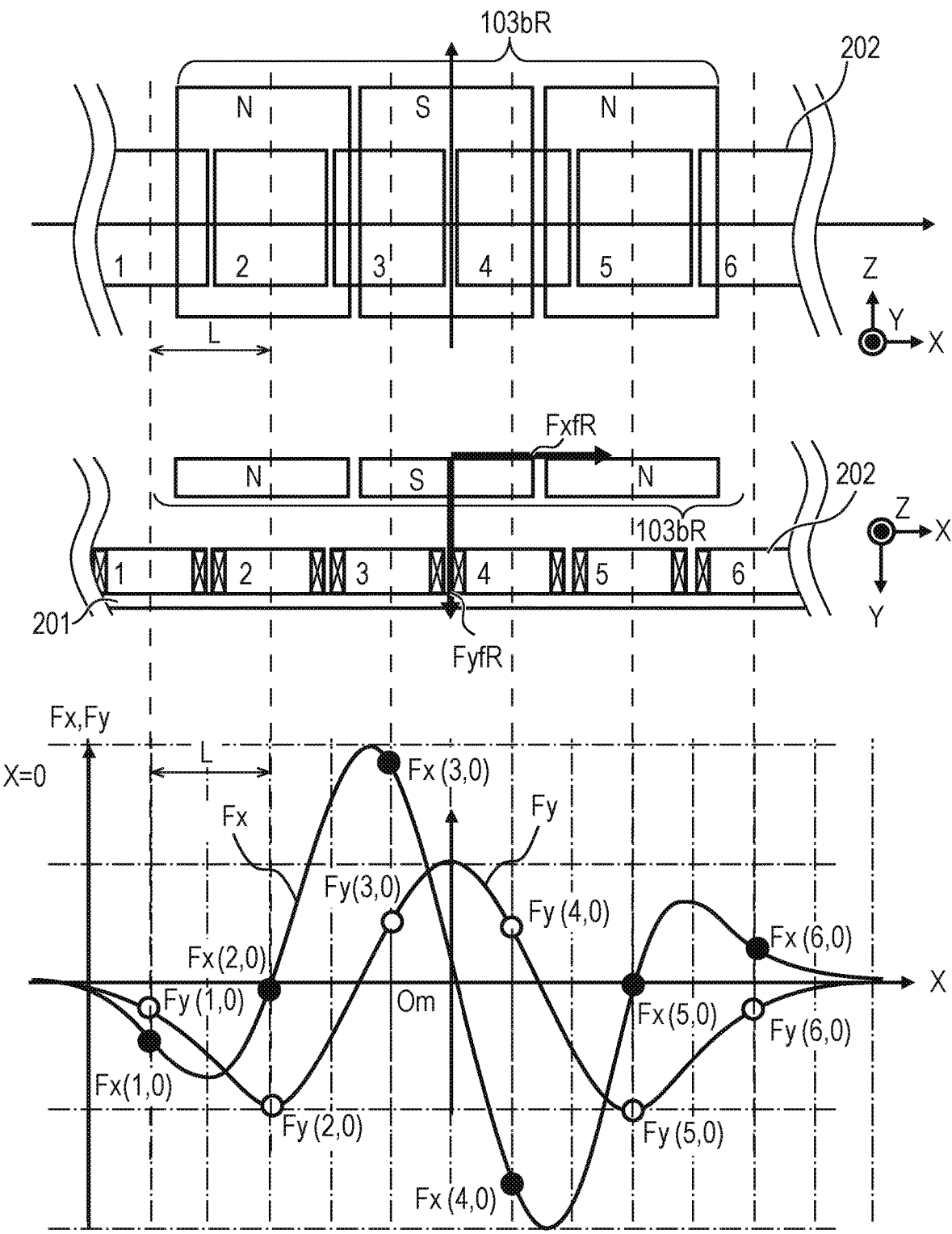
FIG. 9 is a schematic diagram illustrating a method of applying force in the X-direction and the Y-direction independently to permanent magnets of the mover in the transport system according to the first embodiment.

Next, a method of applying force independently in the X-direction and the Y-direction to the permanent magnet 103b whose polarities of N-pole, S-pole, and N-pole are aligned alternatingly in the X-direction will be described. FIG. 9 is a schematic diagram illustrating a method of applying force independently in the X-direction and the Y-direction to the permanent magnet 103b. The coil current calculation function 404 determines a current instruction value applied to the coil 202 in order to apply force independently in the X-direction and the Y-direction to the permanent magnet 103b as below. Note that force can be applied independently in the X-direction and the Y-direction also to the permanent magnet 103c in the same manner as for the permanent magnet 103b.

The value X denotes the position of the mover 101, the value j denotes the number of one of the coils 202 aligned in a line, and the magnitudes of force working in the X-direction and the Y-direction of the coil 202(j) per unit current are denoted as Fx(j, X) and Fy(j, X), respectively. Further, a current value conducted in the coil 202(j) is denoted as i(j). Note that the coil 202(j) is the j-th coil 202.

The diagram in the upper part of FIG. 9 is a view in which the X-axis is defined horizontally, the Y-axis is defined vertically, and six coils 202 facing the permanent magnet 103bR are picked up for illustration. The diagram in the middle part of FIG. 9 is a view when the diagram in the upper part of FIG. 9 is viewed from the Z-direction. Numbers j between 1 and 6 are provided to the coils 202 in the order of alignment in the X-direction, and each of the coils 202 is identified below by denoting one as the coil 202(1), for example.

As illustrated in diagrams in the upper part and the middle part of FIG. 9, the coils 202 are arranged at a pitch of a distance L. On the other hand, the permanent magnets 103 of the mover 101 are arranged at a pitch of a distance 3/2*L.

The graph in the lower part of FIG. 9 is a graph schematically illustrating the magnitudes of the force Fx in the X-direction and the force Fy in the Y-direction occurring when a unit current is applied to each of the coils 202 illustrated in the diagrams in the upper part and the middle part of FIG. 9.

For simplified illustration, in FIG. 9, the origin Oc of the position in the X-direction of the coils 202 is defined as the midpoint of the coil 202(3) and the coil 202(4), and the center Om in the X-direction of the permanent magnet 103$b$R is defined as the origin. Thus, FIG. 9 illustrates a case where Oc matches Om, that is, a case of X=0.

At this time, for example, the force per unit current working on the coil 202(4) corresponds to the magnitudes of Fx(4, 0) in the X-direction and Fy(4, 0) in the Y-direction. Further, the force per unit current working on the coil 202(5) corresponds to the magnitudes of Fx(5, 0) in the X-direction and Fy(5, 0) in the Y-direction.

Here, the current values applied to the coils 202(1) to 202(6) are assumed to be i(1) to i(6), respectively. Then, the magnitude FxfR of force working in the X-direction and the magnitude FyfR of force working in the Y-direction on the permanent magnet 103$b$R are expressed by Equations (9) and (10) below in general, respectively.

$$FxfR = Fx(1, X) * i(1) + Fx(2, X) * i(2) + Fx(3, X) * i(3) + Fx(4, X) * i(4) + Fx(5, X) * i(5) + Fx(6, X) * i(6) \quad \text{Equation (9)}$$

$$FyfR = Fy(1, X) * i(1) + Fy(2, X) * i(2) + Fy(3, X) * i(3) + Fy(4, X) * i(4) + Fy(5, X) * i(5) + Fy(6, X) * i(6) \quad \text{Equation (10)}$$

By determining a current instruction value so that current values i(1) to i(6) satisfying Equations (9) and (10) described above are applied to the coils 202(1) to 202(6), respectively, it is possible to apply force independently in the X-direction and the Y-direction to the permanent magnet 103$b$R. The coil current calculation function 404 can determine a current instruction value applied to the coil 202(j) as described above in order to apply force independently in the X-direction and the Y-direction to the permanent magnet 103.

For more simplified illustration, in the case illustrated in FIG. 9, a considered example is a case where only the coils 202(3), 202(4), and 202(5) out of the coils 202(1) to 202(6) are used for the permanent magnet 103$b$R and further the current values of these three coils are controlled so that the sum thereof becomes zero. In the case of this example, the force FxfR working in the X-direction and the force FyfR working in the Y-direction on the permanent magnet 103$b$R are represented by Equations (11) and (12) below, respectively.

$$FxfR = Fx(3, X) * i(3) + Fx(4, X) * i(4) + Fx(5, X) * i(5) \quad \text{Equation (11)}$$

$$FyfR = Fy(3, X) * i(3) + Fy(4, X) * i(4) + Fy(5, X) * i(5) \quad \text{Equation (12)}$$

Further, the current values of the coils 202(1) to 202(6) are set so as to satisfy Equations (13) and (14) below.

$$i(3) + i(4) + i(5) = 0 \quad \text{Equation (13)}$$

$$i(1) = i(2) = i(6) = 0 \quad \text{Equation (14)}$$

Therefore, when the magnitudes of force (FxfR, FyfR) required for the permanent magnet 103$b$R are determined, the current values i(1), i(2), i(3), i(4), i(5), and i(6) are uniquely determined. The force is applied in the X-direction and the Y-direction to the mover 101 in accordance with the current instruction value determined in such a way. By receiving the force in the X-direction applied to the mover 101, the mover 101 obtains propulsion force of motion in the X-direction and moves in the X-direction. Further, the attitude of the mover 101 is controlled by the force in the X-direction and the Y-direction applied to the mover 101 in accordance with the current instruction value determined in such a way.

In such a way, the integration controller 301 controls respective six-axis components of the force applied to the mover 101 by controlling the current applied to the plurality of coils 202.

Note that, when the center Oc of the coil 202 moves with respect to the center Om of the permanent magnet 103$b$R due to transportation of the mover 101, that is, when X≠0, the coil 202 corresponding to the position after the motion can be selected. Furthermore, the same calculation as described above can be performed based on the force per unit current occurring in the coil 202.

As described above, the integration controller 301 controls contactless transportation of the mover 101 above the stator 201 while controlling the attitude of the mover 101 above the stator 201 with respect to six axes by controlling determining a current instruction value of a current applied to the plurality of coils 202. That is, the integration controller 301 functions as a transport control unit that controls transportation of the mover 101 and controls contactless transportation of the mover 101 above the stator 201 by controlling electromagnetic force received by the permanent magnet 103 from the plurality of coils 202. Further, the integration controller 301 functions as an attitude control unit that controls the attitude of the mover 101 and controls the attitude of the mover 101 above the stator 201 with respect to six axes. Note that all or a part of the function of the integration controller 301 as a control apparatus may be replaced with the coil controller 302 or other control apparatuses.

As discussed above, according to the present embodiment, the six-axis force of three-axis force components (Tx, Ty, Tz) and three-axis moment components (Twx, Twy, Twz) can be applied to the mover 101 by using the plurality of coils 202 arranged in two lines. Thereby, it is possible to control transport of the mover 101 while controlling the attitude of the mover 101 with respect to six axes. According to the present embodiment, it is possible to control transport of the mover 101 while controlling the attitude of the mover 101 with respect to six axes by using two lines of the coils 202 where the number of lines is smaller than the number of six-axis components of force that are variables to be controlled.

Therefore, according to the present embodiment, since the number of lines of the coils 202 can be smaller, the mover 101 can be transported contactlessly while the attitude of the mover 101 is controlled without involving an increase in size or an increase in complexity of the system. Furthermore, according to the present embodiment, since the number of lines of the coils 202 can be smaller, an inexpensive and compact magnetic levitation type transport system can be configured.

Further, according to the present embodiment, since the permanent magnets 103 are arranged on the side face of the mover 101, good access to the workpiece 102 can be realized. Thereby, it is possible to perform a processing operation on the workpiece 102 on the mover 101 by using a process apparatus with great flexibility.

Second Embodiment

Figure 10:
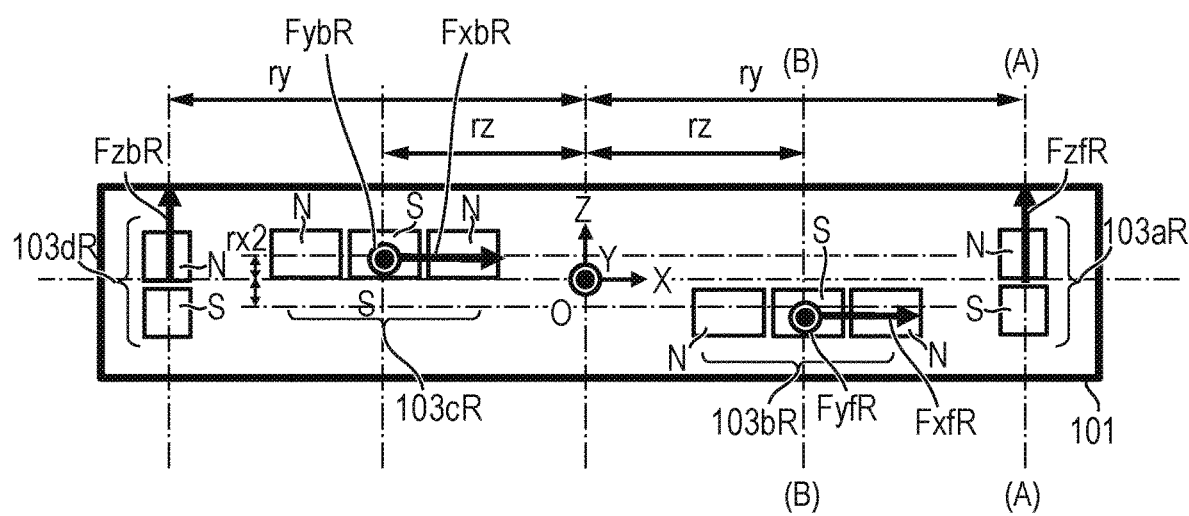
FIG. 10 is a schematic diagram illustrating a mover in a transport system according to a second embodiment.
Figure 11:
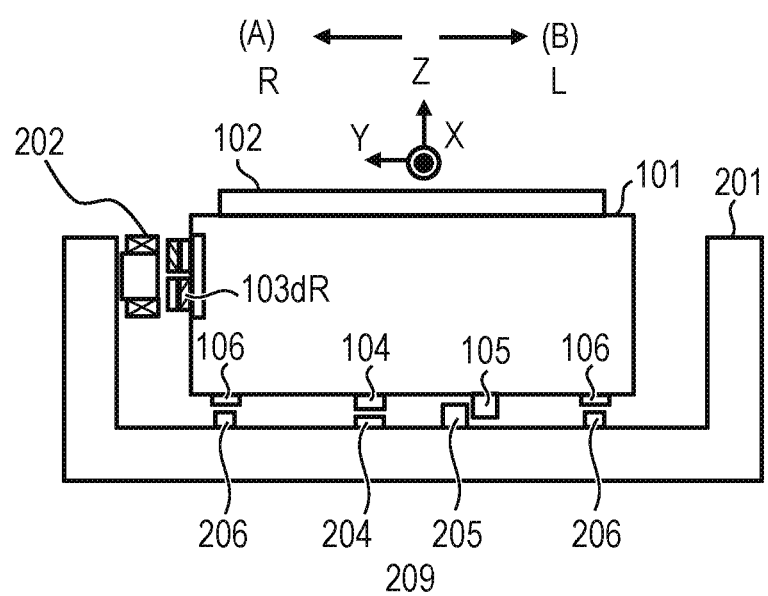
FIG. 11 is a schematic diagram illustrating a mover and a stator in a transport system according to the second embodiment.

A second embodiment of the present invention will be described by using FIG. 10 and FIG. 11. FIG. 10 is a schematic diagram illustrating the mover 101 according to the present embodiment. FIG. 11 is a schematic diagram illustrating the mover 101 and the stator 201 according to the present embodiment. Note that components similar to those in the first embodiment described above are labeled with the same references, and the description thereof will be omitted or simplified.

The basic configuration of the mover 101 according to the present embodiment is substantially the same as the configuration according to the first embodiment. The mover 101 according to the present embodiment is different from the configuration according to the first embodiment in the attachment form of the permanent magnets 103.

FIG. 10 is a diagram of the mover 101 according to the present embodiment when viewed from the Y-direction. FIG. 10 illustrates the arrangement of the permanent magnet 103 on the side face on the R-side of the mover 101 according to the present embodiment.

As illustrated in FIG. 10, unlike the first embodiment illustrated in FIG. 1B, the permanent magnets 103bR and 103cR are attached to the mover 101 according to the present embodiment at positions distant from the center of the mover 101 by a distance rx2 in the Z-direction, respectively. The permanent magnet 103b is attached at a position distant from the center of the mover 101 by a distance rx2 on the bottom side of the mover 101. On the other hand, the permanent magnet 103c is attached at a position distant from the center of the mover 101 by a distance rx2 on the top side of the mover 101.

FIG. 11 is a diagram of the mover 101 and the stator 201 according to the present embodiment when viewed from the X-direction. The left half of FIG. 11 represents a cross section (A) taken along a line (A)-(A) of FIG. 10. The right half of FIG. 11 represents a cross section (B) taken along a line (B)-(B) of FIG. 10.

As illustrated in FIG. 11, in the mover 101 according to the present embodiment, the permanent magnets 103 are attached to the one side face, specifically, only the side face on the R-side of the mover 101 unlike the case of the first embodiment illustrated in FIG. 2.

Unlike the case of the first embodiment where the plurality of coils 202 are aligned in two lines, the plurality of coils 202 are aligned in a line parallel to the X-direction in the stator 201 according to the present embodiment in association with the arrangement where the permanent magnets 103 are attached on only one side face of the mover 101. That is, the plurality of coils 202 are arranged and attached to be in a line parallel to the X-direction so as to be able to face the permanent magnets 103aR, 103bR, 103cR, and 103dR on the side face on the R-side, namely, one side of the mover 101 in the stator 201 according to the present embodiment.

In the case of the mover 101 according to the present embodiment, respective components indicated in Equation (6) of the force T applied to the mover 101 are expressed by Equations (15a), (15b), (15c), (15d), (15e), and (15f) below.

$$Tx = FxfR + FxbR \qquad \text{Equation (15a)}$$
$$Ty = FyfR + FybR \qquad \text{Equation (15b)}$$
$$Tz = FzbR + FzfR \qquad \text{Equation (15c)}$$
$$Twx = (FybR - FyfR) * rx2 \qquad \text{Equation (15d)}$$
$$Twy = (FzfR - FzbR) * ry \qquad \text{Equation (15e)}$$
$$Twz = (FyfR - FybR) * rz \qquad \text{Equation (15f)}$$

Therefore, even when the permanent magnets 103 are arranged on the R-side, namely, only one side, the six-axis force of the three-axis force components (Tx, Ty, Tz) and the three-axis moment components (Twx, Twy, Twz) can be applied to the mover 101 by using the plurality of coils 202 arranged in a line.

As described above, according to the present embodiment, the six-axis force of three-axis force components (Tx, Ty, Tz) and three-axis moment components (Twx, Twy, Twz) can be applied to the mover 101 by using the plurality of coils 202 arranged in a single line. Thereby, it is possible to control transport of the mover 101 while controlling the attitude of the mover 101 with respect to six axes. According to the present embodiment, it is possible to control transport of the mover 101 while controlling the attitude of the mover 101 with respect to six axes by using a single line of the coils 202 where the number of lines is smaller than the number of six-axis components of force that are variables to be controlled.

Therefore, according to the present embodiment, since the number of lines of the coils 202 can be smaller, the mover 101 can be transported contactlessly while the attitude of the mover 101 is controlled without involving an increase in size or an increase in complexity of the system. Furthermore, according to the present embodiment, since the number of lines of the coils 202 can be smaller, a more inexpensive and compact magnetic levitation type transport system can be configured.

Note that, while the case where the permanent magnets 103 are arranged on the R-side, namely, only one side of the side faces on the R-side and the L-side has been described above, the invention is not limited thereto. Contrary to the case described above, the permanent magnets 103 may be arranged on the L-side, namely, only one side of the side faces on the R-side and the L-side.

Third Embodiment

Figure 12:
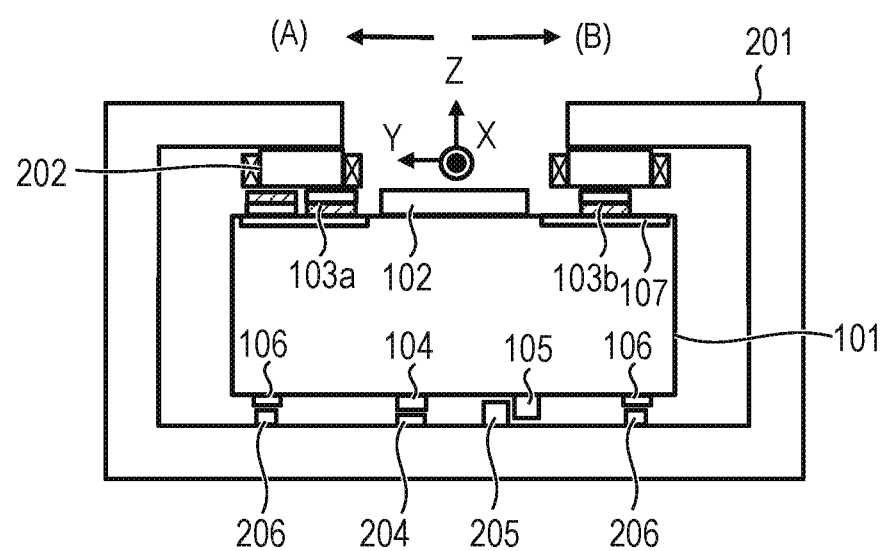
FIG. 12 is a schematic diagram illustrating a mover and a stator in a transport system according to a third embodiment.
Figure 13:
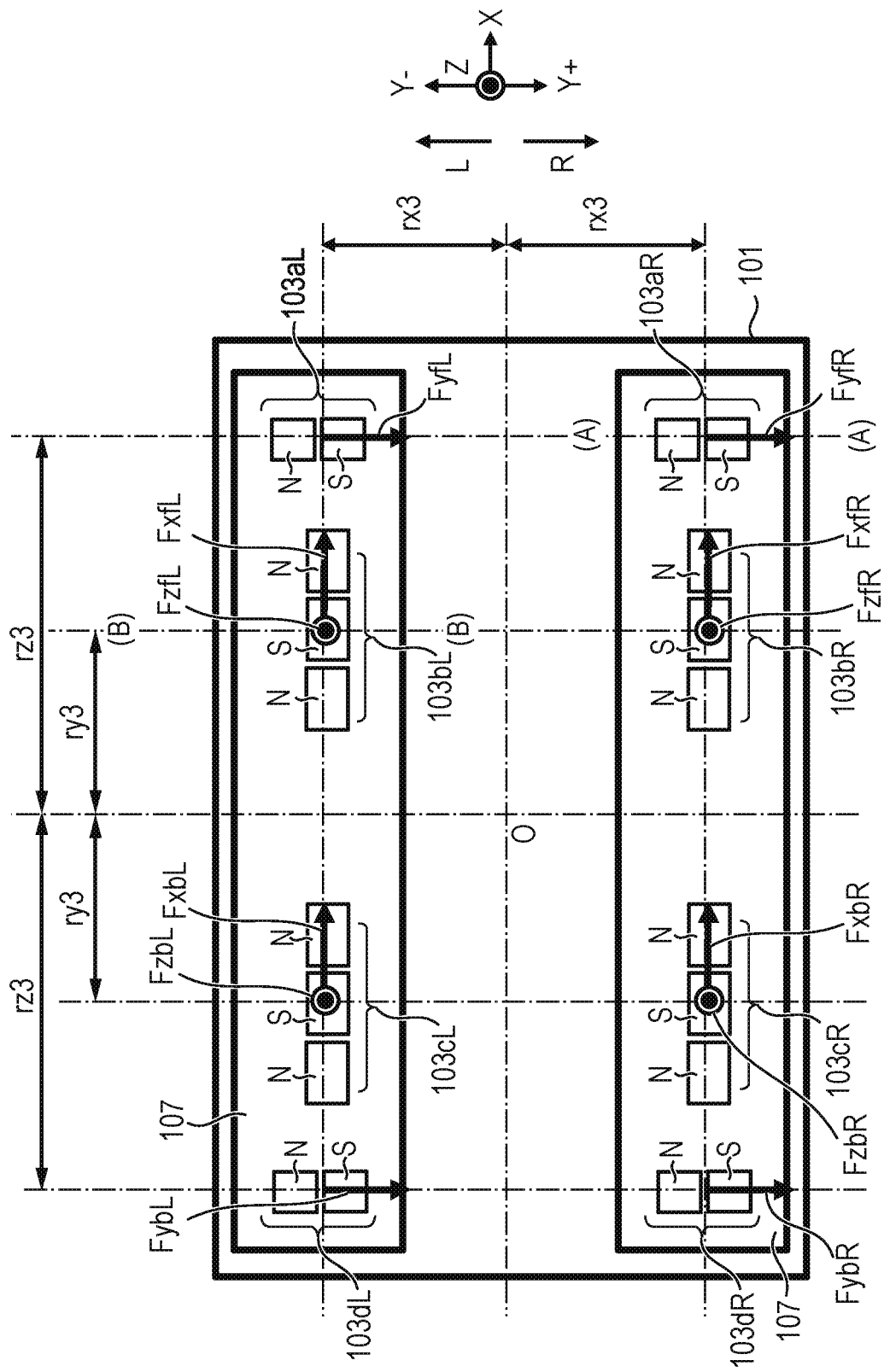
FIG. 13 is a schematic diagram illustrating a mover in a transport system according to the third embodiment.

A third embodiment of the present invention will be described by using FIG. 12 and FIG. 13. FIG. 12 is a schematic diagram illustrating the mover 101 and the stator 201 according to the present embodiment. FIG. 13 is a schematic diagram illustrating the mover 101 according to the present embodiment. Note that components similar to those in the first and second embodiments described above are labeled with the same references, and the description thereof will be omitted or simplified.

The basic configuration of the mover 101 according to the present embodiment is substantially the same as the configuration according to the first embodiment. The mover 101 according to the present embodiment is different from the configuration according to the first and second embodiments in the attachment form of the permanent magnets 103.

FIG. 12 is a diagram of the mover 101 and the stator 201 according to the present embodiment when viewed from the X-direction. As illustrated in FIG. 12, unlike the first embodiment illustrated in FIG. 2, the permanent magnets 103 are arranged and attached on the top face parallel to the X-direction of the mover 101 in the present embodiment. The permanent magnet 103 is attached to the yoke 107 provided on the top face of the mover 101.

FIG. 13 is a diagram of the mover 101 according to the present embodiment when viewed from the Z-direction. FIG. 13 illustrates the arrangement of the permanent magnets 103 on the top view of the mover 101 according to the present embodiment.

As illustrated in FIG. 13, the permanent magnets 103aR, 103bR, 103cR, and 103dR are arranged in portions on the R-side on the top face of the mover 101. The permanent magnets 103aR, 103bR, 103cR, and 103dR are arranged at positions distant from the origin O, which is the center of the mover 101, by a distance rx3 on the R-side in the Y-direction, respectively.

Further, the permanent magnets 103aL, 103bL, 103cL, and 103dL are arranged in portions on the L-side on the top face of the mover 101. The permanent magnets 103aL, 103bL, 103cL, and 103dL are arranged at positions distant from the origin O by the distance rx3 on the L-side in the Y-direction.

The permanent magnets 103aR, 103bR, 103cR, and 103dR are arranged in substantially the same manner as the arrangement on the side face on the R-side of the mover 101 according to the first embodiment at portions on the R-side on the top face of the mover 101. Further, the permanent magnets 103aL, 103bL, 103cL, and 103dL are arranged in substantially the same manner as the arrangement on the side face on the L-side of the mover 101 according to the first embodiment in portions on the L-side on the top face of the mover 101.

The permanent magnets 103a and 103d are attached at positions distant from the origin O by a distance rz3 on one side and the other side in the X-direction, respectively. The permanent magnets 103c and 103b are attached at positions distant from the origin O by a distance ry3 on one side and the other side in the X-direction, respectively.

On the top face of the mover 101, the center portion between the R-side portion and the L-side portion in which the permanent magnets 103 are arranged as described above serves as a portion on which the workpiece 102 to be transported is placed.

On the other hand, as illustrated in FIG. 12, the plurality of coils 202 are attached to the stator 201 so as to be located above the top face of the mover 101. The plurality of coils 202 are arranged in two lines parallel to the X-direction so as to be able to face downward both the permanent magnets 103 on the R-side and the L-side on the top face of the mover 101 and attached to the stator 201. The plurality of coils 202 on the R-side are aligned in a line parallel to the X-direction so as to be able to face downward the permanent magnets 103aR, 103bR, 103cR, and 103dR on the R-side of the mover 101. The plurality of coils 202 on the L-side are arranged in a line parallel to the X-direction so as to be able to face downward the permanent magnets 103aL, 103bL, 103cL, and 103dL on the L-side of the mover 101.

When the mover 101 according to the present embodiment, respective components indicated in Equation (6) of the force T applied to the mover 101 are expressed by Equations (16a), (16b), (16c), (16d), (16e), and (16f) below.

$$Tx = FxfR + FxbR + FxfL + FxbL \quad \text{Equation (16a)}$$

$$Ty = FyfL + FyfR + FybL + FybR \quad \text{Equation (16b)}$$

$$Tz = FzbR + FzbL + FzfR + FzfL \quad \text{Equation (16c)}$$

$$Twx = \{(FzfL + FzbL) - (FzfR + FzbR)\} * rx3 \quad \text{Equation (16d)}$$

$$Twy = \{(FzfL + FzfR) - (FzbL + FzbR)\} * ry3 \quad \text{Equation (16e)}$$

$$Twz = \{(FybL + FybR) - (FyfL + FyfR)\} * rz3 \quad \text{Equation (16f)}$$

At this time, restrictions expressed by Equations (16g), (16h), (16i), and (16j) below can be introduced for force working on the permanent magnet 103. By introducing these restrictions, it is possible to uniquely determine a combination of force components working on respective permanent magnets 103 to obtain the force T having predetermined six-axis components.

$$FxfR = FxbR = FxfL = FxbL \quad \text{Equation (16g)}$$

$$FyfL = FyfR \quad \text{Equation (16h)}$$

$$FybL = FybR \quad \text{Equation (16i)}$$

$$FzbR = FzbL \quad \text{Equation (16j)}$$

Therefore, even when the permanent magnets 103 are arranged on the top face, the six-axis force of the three-axis force components (Tx, Ty, Tz) and the three-axis moment components (Twx, Twy, Twz) can be applied to the mover 101 by using the plurality of coils 202 arranged in two lines.

As described above, according to the present embodiment, the six-axis force of three-axis force components (Tx, Ty, Tz) and three-axis moment components (Twx, Twy, Twz) can be applied to the mover 101 by using the plurality of coils 202 arranged in two lines. Thereby, it is possible to control transport of the mover 101 while controlling the attitude of the mover 101 with respect to six axes. According to the present embodiment, it is possible to control transport of the mover 101 while controlling the attitude of the mover 101 with respect to six axes by using two lines of the coils 202 where the number of lines is smaller than the number of six-axis components of force that are variables to be controlled.

Therefore, according to the present embodiment, since the number of lines of the coils 202 can be smaller, the mover 101 can be transported contactlessly while the attitude of the mover 101 is controlled without involving an increase in size or an increase in complexity of the system.

Further, in the present embodiment, the coils 202 can be further formed to include an iron core therein. This causes strong absorption force to work between the iron core of the coil 202 and the permanent magnet 103 and thus contributes to levitate the mover 101. In particular, the coil 202 including an iron core is preferable when the weight of the mover 101 or the workpiece 102 placed on the mover 101 is large. Note that the iron core of the coil 202 may be any iron core as long as it causes attractive force with respect to at least any of the permanent magnets 103a, 103b, 103c, and 103d.

Note that various modified examples are possible for the mover 101 according to the third embodiment described above. The mover 101 according to first to fourth modified examples of the third embodiment described above will be described below.

First Modified Example

The mover 101 according to a first modified example will be described by using FIG. 14A. FIG. 14A is a schematic diagram illustrating the mover 101 according to the present modified example.

The basic configuration of the mover 101 according to the present modified example is substantially the same as that of the third embodiment illustrated in FIG. 12 and FIG. 13 described above. The mover 101 according to the present modified example is different from the configuration according to the third embodiment in the form of attachment of the permanent magnets 103.

FIG. 14A is a diagram of the mover 101 according to the present modified example when viewed from the Z-direction. FIG. 14A illustrates the arrangement of the permanent magnets 103 on the top face of the mover 101 according to the present modified example.

As illustrated in FIG. 14A, the permanent magnets 103bR, 103cR, and 103eR are arranged in the portions on the R-side on the top face of the mover 101. The permanent magnets 103bR, 103cR, and 103eR are arranged at positions distant by the distance rx3 on the R-side in the Y-direction from the center line in the X-direction running through the origin O, which is the center of the mover 101, respectively.

Further, the permanent magnets 103bL, 103cL, and 103eL are arranged in the portions on the L-side on the top face of the mover 101. The permanent magnets 103bL, 103cL, and 103eL are arranged at positions distant by the distance rx3 on the L-side in the Y-direction from the center line in the X-direction running through the origin O, respectively.

The permanent magnets 103bR and 103cR are arranged in substantially the same manner as the arrangement on the top face on the R-side of the mover 101 according to the third embodiment illustrated in FIG. 13 in the portions on the R-side on the top face of the mover 101. Further, the permanent magnets 103bL and 103cL are arranged in substantially the same manner as the arrangement on the top face on the L-side of the mover 101 according to the third embodiment illustrated in FIG. 13 in the portions on the L-side on the top face of the mover 101.

In the present modified example, without the permanent magnets 103aR, 103dR, 103aL, and 103dL illustrated in FIG. 13 being arranged, instead, the permanent magnet 103eR is arranged between the permanent magnets 103bR and 103cR. Further, in the present modified example, the permanent magnet 103eL is arranged between the permanent magnets 103bL and 103cL. These features make the present modified example different from the third embodiment illustrated in FIG. 13. The arrangement of the magnets of the permanent magnets 103eR and 103eL is similar to that of the permanent magnets 103aR and 103aL, respectively.

When the mover 101 according to the present modified example, respective components indicated in Equation (6) of the force T applied to the mover 101 are expressed by Equations (17a), (17b), (17c), (17d), (17e), and (17f) below.

$$Tx = FxfL + FxbL + FxfR + FxbR \quad \text{Equation (17a)}$$

$$Ty = FycL + FycR \quad \text{Equation (17b)}$$

$$Tz = FzfL + FzbL + FzfR + FzbR \quad \text{Equation (17c)}$$

$$Twx = \{(FzfL + FzbL) - (FzfR + FzbR)\} * rx3 \quad \text{Equation (17d)}$$

$$Twy = \{(FzfL + FzfR) - (FzbL + FzbR)\} * ry3 \quad \text{Equation (17e)}$$

$$Twz = \{(FxfR + FxbR) - (FxfL + FxbL)\} * rz3 \quad \text{Equation (17f)}$$

According to the present modified example, the number of the permanent magnets 103 arranged on the mover 101 can be reduced. Note that, while force in the Z-direction is unable to be controlled in the permanent magnets 103eR and 103eL illustrated in FIG. 14A, it is possible to improve controllability toward the Z-direction by increasing the number of permanent magnets aligned and arranged in the X-direction.

Second Modified Example

The mover 101 according to a second modified example will be described by using FIG. 14B. FIG. 14B is schematic diagram illustrating the mover 101 according to the present modified example.

The basic configuration of the mover 101 according to the present modified example is substantially the same as the configuration of the mover 101 according to the first modified example illustrated in FIG. 14A described above. The mover 101 according to the present modified example is different from the configuration of the first modified example in that one of the permanent magnets 103eR and 103eL is not arranged.

FIG. 14B is a diagram of the mover 101 according to the present modified example when viewed from the Z-direction. FIG. 14B illustrates the arrangement of the permanent magnets 103 on the top face of the mover 101 according to the present modified example.

As illustrated in FIG. 14B, in the present modified example, the permanent magnets 103eL is arranged between the permanent magnets 103bL and 103cL in the same manner as the first modified example. On the other hand, in the present modified example, unlike the first modified example, the permanent magnet 103eR is not arranged between the permanent magnets 103bR and 103cR.

As discussed above, in the present modified example, only the permanent magnet 103eL of the permanent magnets 103eR and 103eL according to the first modified example is arranged. Note that, unlike the case illustrated in FIG. 14B, only the permanent magnet 103eR of the permanent magnets 103eR and 103eL may be arranged.

When the mover 101 according to the present modified example, respective components indicated in Equation (6) of the force T applied to the mover 101 are expressed by Equations (17a), (17c), (17d), (17e), and (17f) described above except for the Y-direction force component Ty. In the case of the present modified example, the Y-direction force component Ty is expressed by Equation (18b) below.

$$Ty = FycL \quad \text{Equation (18b)}$$

According to the present modified example, the number of permanent magnets 103 arranged on the mover 101 can be further reduced compared to the first modified example. Also in the present modified example, by controlling Ty and Twz, it is possible to control six-axis components of force including the Y-direction.

Third Modified Example

Figure 14C:
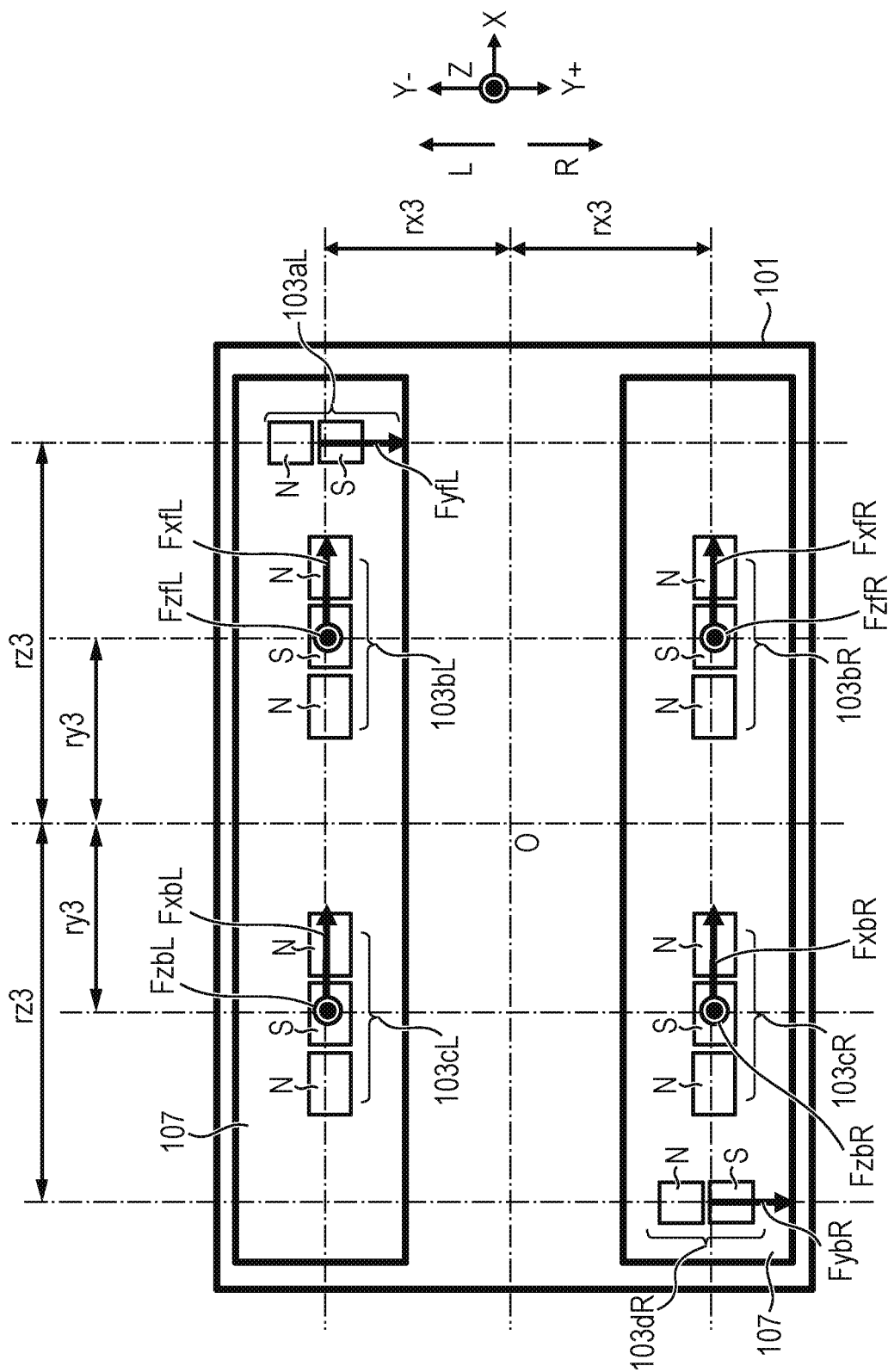
FIG. 14C is a schematic diagram illustrating a mover in a transport system according to a third modified example of the third embodiment.

The mover 101 according to a third modified example will be described by using FIG. 14C. FIG. 14C is a schematic diagram illustrating the mover 101 according to the present modified example.

The basic configuration of the mover 101 according to the present modified example is substantially the same as that of the third embodiment illustrated in FIG. 12 and FIG. 13 described above. The mover 101 according to the present modified example is different from the configuration according to the third embodiment in the form of attachment of the permanent magnets 103.

FIG. 14C is a diagram of the mover 101 according to the present modified example when viewed from the Z-direction. FIG. 14C illustrates the arrangement of the permanent magnets 103 on the top face of the mover 101 according to the present modified example.

As illustrated in FIG. 14C, the permanent magnets 103bR, 103cR, and 103dR are arranged in the portions on the R-side on the top face of the mover 101. The permanent magnets 103bR, 103cR, and 103dR are arranged at positions distant by the distance rx3 on the R-side in the Y-direction from the center line in the X-direction running through the origin O, which is the center of the mover 101, respectively.

Further, the permanent magnets 103aL, 103bL, and 103cL are arranged in the portions on the L-side on the top face of the mover 101. The permanent magnets 103aL, 103bL, and 103cL are arranged at positions distant by the distance rx3 on the L-side in the Y-direction from the center line in the X-direction running through the origin O, respectively.

The permanent magnets 103bR, 103cR, and 103dR are arranged in substantially the same manner as the arrangement on the top face on the R-side of the mover 101 according to the third embodiment illustrated in FIG. 13 in the portions on the R-side on the top face of the mover 101. In the present modified example, unlike the third embodiment illustrated in FIG. 13, the permanent magnet 103aR is not arranged.

Further, the permanent magnets 103aL, 103bL, and 103cL are arranged in substantially the same manner as the arrangement on the top face on the L-side of the mover 101 according to the third embodiment illustrated in FIG. 13 in the portions on the L-side on the top face of the mover 101. In the present modified example, unlike the third embodiment illustrated in FIG. 13, the permanent magnet 103dL is not arranged.

Note that, in contrast to the present modified example, the permanent magnets 103aR and 103dL may be arranged, and the permanent magnets 103dR and 103aL may not be arranged.

In the second modified example described above, when the mover 101 passes through a region where no coil 202 can be arranged so as to face the permanent magnets 103eL, a situation where the Y-direction force component Ty cannot be applied may occur. In contrast, in the present modified example, with the coils 202 being arranged so as to face at least any one of the permanent magnets 103dR and 103aL, the Y-direction force component Ty can be applied. Thereby, in the present modified example, it is possible to control the six-axis components of force including the Y-direction more reliably than in the second modified example. That is, the present modified example may be tolerant to a case where no force can be applied in the Y-direction in the second modified example.

When the mover 101 according to the present modified example, respective components indicated in Equation (6) of the force T applied to the mover 101 are expressed by Equations (17a), (17c), (17d), and (17e) described above except for the Y-direction force component Ty and the around-Z-axis moment component Twz. In the case of the present modified example, the Y-direction force component Ty and the around-Z-axis moment component Twz are expressed by Equations (19b-1) and (19f-1) or Equations (19b-2) and (19f-2) below in accordance with which of the permanent magnet 103dR or 103aL faces the coil 202.

First, when the permanent magnet 103dR does not face the coil 202 and the permanent magnet 103aL faces the coil 202, the Y-direction force component Ty and the around-Z-axis moment component Twz are expressed by Equations (19b-1) and (19f-1) below.

$$Ty = FyfL \qquad \text{Equation (19b-1)}$$

$$Twz = \{(FxfR + FxbR) - (FxfL + FxbL)\} * rx3 - FyfL * rz3 \qquad \text{Equation (19f-1)}$$

On the other hand, when the permanent magnet 103aL does not face the coil 202 and the permanent magnet 103dR faces the coil 202, the Y-direction force component Ty and the around-Z-axis moment component Twz are expressed by Equations (19b-2) and (19f-2) below.

$$Ty = FybR \qquad \text{Equation (19b-2)}$$

$$Twz = \{(FxfR + FxbR) - (FxfL + FxbL)\} * rx3 + FybR * rz3 \qquad \text{Equation (19f-2)}$$

Note that, when the permanent magnets 103aL and 103dR face the coil 202, the Y-direction force component Ty and the around-Z-axis moment component Twz are expressed by Equations (19b-3) and (19f-3) below.

$$Ty = FyfL + FybR \qquad \text{Equation (19b-3)}$$

$$Twz = \{(FxfR + FxbR) - (FxfL + FxbL)\} * rx3 + (FybR - FyfL) * rz3 \qquad \text{Equation (19f-3)}$$

Fourth Modified Example

The mover 101 according to a fourth modified example will be described by using FIG. 14D. FIG. 14D is a schematic diagram illustrating the mover 101 according to the present modified example.

The basic configuration of the mover 101 according to the present modified example is substantially the same as that of the third embodiment illustrated in FIG. 12 and FIG. 13 described above. The mover 101 according to the present modified example is different from the configuration according to the third embodiment in the form of attachment of the permanent magnets 103.

FIG. 14D is a diagram of the mover 101 according to the present modified example when viewed from the Z-direction. FIG. 14D illustrates the arrangement of the permanent magnets 103 on the top face of the mover 101 according to the present modified example.

As illustrated in FIG. 14D, the permanent magnets 103bR and 103cR are arranged in the portions on the R-side on the top face of the mover 101. The permanent magnets 103bR and 103cR are arranged at positions distant by the distance rx3 on the R-side in the Y-direction from the center line in the X-direction running through the origin O, which is the center of the mover 101, respectively.

In the present modified example, a plurality of permanent magnets 103giR (where i=1, 2, 3, 4, 5) similar to the permanent magnets 103aR are aligned and arranged at a constant interval in the X-direction outside the permanent magnets 103bR and 103cR in portions on the R-side on the top face of the mover 101. A yoke 107 to which the plurality of permanent magnets 103giR are attached is separated from a yoke 107 to which the permanent magnets 103bR and 103cR are attached. The plurality of permanent magnets 103giR are not limited to the five illustrated in FIG. 14D, and the number of permanent magnets 103giR may be any number as long as it is plural.

Further, the permanent magnets 103bL and 103cL are arranged in the portions on the L-side on the top face of the mover 101. The permanent magnets 103bL and 103cL are arranged at positions distant by the distance rx3 on the L-side in the Y-direction from the center line in the X-direction running through the origin O, respectively.

In the present modified example, a plurality of permanent magnets 103giL (where i=1, 2, 3, 4, 5) similar to the permanent magnets 103aL are aligned and arranged at a constant interval in the X-direction outside the permanent magnets 103bL and 103cL in portions on the L-side on the top face of the mover 101. A yoke 107 to which the plurality of permanent magnets 103giL are attached is separated from a yoke 107 to which the permanent magnets 103bL and 103cL are attached. The plurality of permanent magnets 103giL are not limited to the five illustrated in FIG. 14D, and the number of permanent magnets 103giL may be any number as long as it is plural.

As discussed above, the yoke 107 to which the permanent magnets 103a and 103d formed of a group of magnets in which permanent magnets are aligned in the Y-direction are attached is separated from the yoke 107 to which the permanent magnets 103b and 103c formed of a group of magnets in which permanent magnets are aligned in the X-direction are attached. Thereby, unnecessary interference of the magnetic flux can be reduced or prevented, and controllability can be improved. However, the yokes 107 may be integrally formed without being separated. In such a case, the mover 101 can be configured with low cost compared to the case where the yokes 107 are separated.

Note that, also in the case of the third embodiment illustrated in FIG. 13, the yokes 107 to which the permanent magnets 103 formed of a group of magnets in which permanent magnets are aligned in directions different from each other are attached may be separated from each other in the same manner as in the present modified example. In such a case, the yoke 107 to which the permanent magnets 103a and 103d formed of a group of magnets in which permanent magnets are aligned in the Y-direction are attached may be separated from the yoke 107 to which the permanent magnets 103b and 103c formed of a group of magnets in which permanent magnets are aligned in the X-direction are attached.

Figure 15:
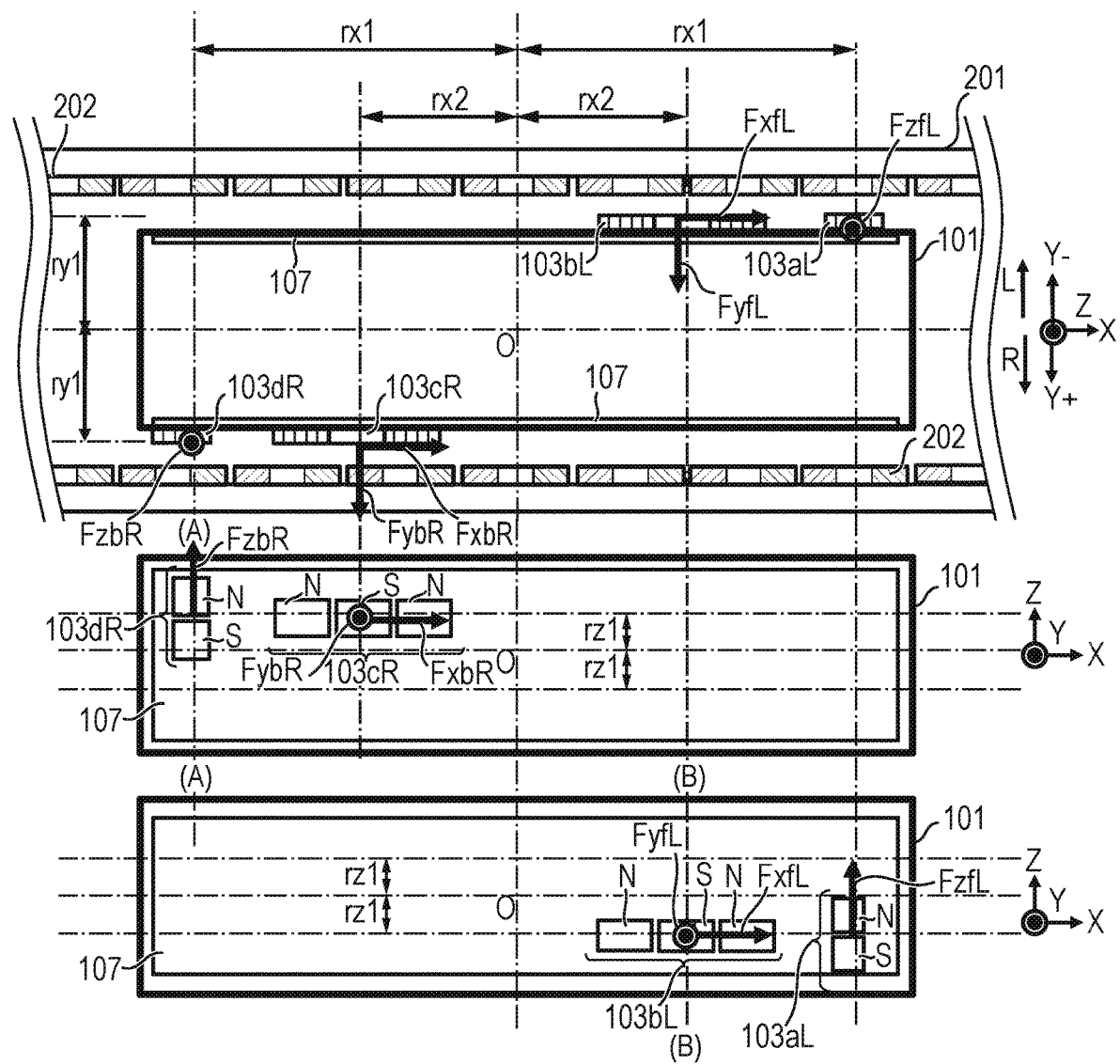
FIG. 15 is a schematic diagram illustrating a mover and a stator in a transport system according to a fourth embodiment.

Further, also in the first embodiment illustrated in FIG. 1B, the second embodiment illustrated in FIG. 10, and the fourth embodiment illustrated in FIG. 15, the yokes 107 to which the permanent magnets 103 formed of a group of magnets in which permanent magnets are aligned in directions different from each other are attached may be separated from each other in the same manner as in the present modified example. In such a case, the yoke 107 to which the permanent magnets 103a and 103d formed of a group of magnets in which permanent magnets are aligned in the Z-direction are attached may be separated from the yoke 107 to which the permanent magnets 103b and 103c formed of a group of magnets in which permanent magnets are aligned in the X-direction are attached.

In the present modified example, the force working in the Y-direction of the permanent magnet 103giR is denoted as FyiR, the force working in the Y-direction of the permanent magnet 103giL is denoted as FyiL, and then the Y-direction force component Ty corresponds to the sum of force components working on respective permanent magnets 103giR and 103giL. That is, in the case of the mover 101 according to the present modified example, the Y-direction force component Ty is expressed by Equation (20b) below.

$$Ty = \sum FyiR + \sum FyiL \qquad \text{Equation (20b)}$$

According to the present modified example, by adjusting the number of the permanent magnets 103giR and 103giL to be arranged, it is possible to increase or decrease the Y-direction force component Ty.

Other Modified Examples

For the mover 101 according to the third embodiment described above, further other modified examples are possible. For example, to further enhance transportation capacity in the X-axis direction, the number of permanent magnets can be larger than that of magnets of the four sets of the permanent magnets 103bR, 103cR, 103bL, and 103cL. Specifically, many permanent magnets similar to the permanent magnet 103bR can be aligned horizontally in one or more lines to portions on the R-side on the top face of the mover 101. Similarly, many permanent magnets similar to the permanent magnet 103bL can be aligned horizontally in one or more lines to portions on the L-side on the top face of the mover 101.

Fourth Embodiment

Figure 16:
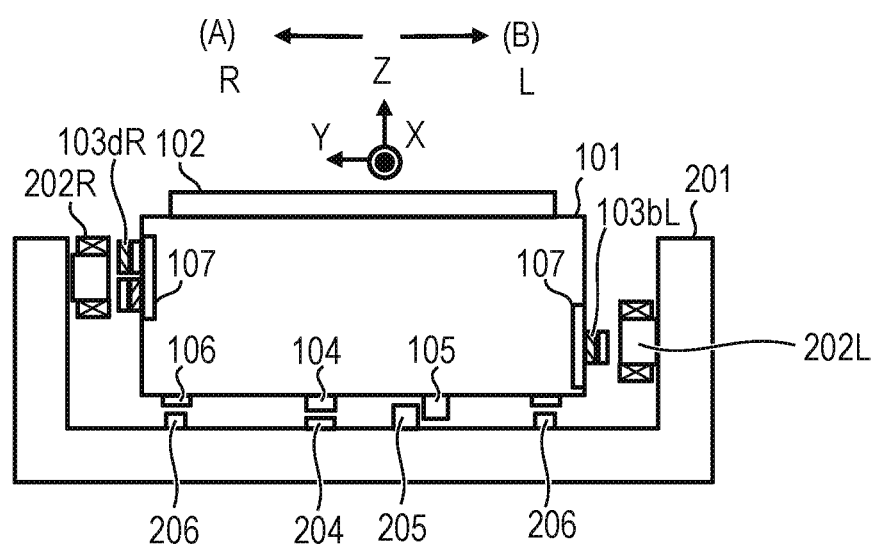
FIG. 16 is a schematic diagram illustrating a mover and a stator in a transport system according to the fourth embodiment.

A fourth embodiment of the present invention will be described by using FIG. 15 and FIG. 16. FIG. 15 and FIG. 16 are schematic diagrams illustrating the mover 101 and the stator 201 according to the present embodiment. Note that components similar to those in the first to third embodiments described above are labeled with the same references, and the description thereof will be omitted or simplified.

The basic configuration of the mover 101 according to the present embodiment is substantially the same as the configuration according to the first embodiment. The mover 101 according to the present embodiment is different from the configuration according to the first to third embodiments in the form of attachment of the permanent magnets 103.

The diagram in the upper part of FIG. 15 is a view of the mover 101 and the stator 201 according to the present embodiment when viewed from the Z+ side in the Z− direction. Note that, for simplified illustration, the workpiece 102 is not illustrated in FIG. 15. The diagram in the middle part of FIG. 15 is a view of the side face on the R-side of the mover 101 according to the present embodiment when viewed from the R-side in the Y-direction. The diagram in the lower part of FIG. 15 is a view of the side face on the L-side of the mover 101 according to the present embodiment when viewed from the L-side in the Y-direction. Note that the diagram in the lower part of FIG. 15 illustrates the inverted view of the side face on the L-side of the mover 101 for better representation.

Further, FIG. 16 is a diagram of the mover 101 and the stator 201 according to the present embodiment when viewed from the X-direction. The left part of FIG. 16 illustrates the sectional view (A) taken along the line (A)-(A) of the diagram in the middle part of FIG. 15. Further, the right part of FIG. 16 illustrates the sectional view (B) taken along the line (B)-(B) of the diagram in the middle part of FIG. 15.

As illustrated in FIG. 15, unlike the first embodiment, the permanent magnets 103cR and 103dR are attached to the side face on the R-side of the mover 101. That is, in the present embodiment, the permanent magnets 103aR and 103bR are not attached to the side face on the R-side of the mover 101.

The permanent magnets 103cR and 103dR are attached to positions distant from the origin O by ry1 in the Y-direction, which is the center of the mover 101, respectively. Further, the permanent magnet 103dR is attached to a position distant from the origin O by rx1 on the other side in the X-direction. Further, the permanent magnet 103cR is attached to a position distant from the origin O by rx2 in the other side in the X-direction.

Further, unlike the first embodiment, the permanent magnets 103aL and 103bL are attached to the side face on the L-side of the mover 101. That is, in the present embodiment, the permanent magnets 103cL and 103dL are not attached to the side face on the L-side of the mover 101.

The permanent magnets 103aL and 103bL are attached to positions distant from the origin O by ry1 in the Y-direction, respectively. Further, the permanent magnet 103aL is attached to a position distant from the origin O by rx1 on one side in the X-direction. Further, the permanent magnet 103bL is attached to a position distant from the origin O by rx2 in one side in the X-direction.

Furthermore, the permanent magnets 103cR and 103dR and the permanent magnets 103aL and 103bL are attached to the mover 101 so that the positions in the Z-direction are shifted in the Z-direction and arranged so as to be different from each other. That is, the permanent magnet 103cR and 103dR are attached to positions distant from the origin O by the distance rz1 on the upper side of the mover 101 in the Z-direction, respectively. On the other hand, further, the permanent magnet 103aL and 103bL are attached to positions distant from the origin O by the distance rz1 on the bottom side of the mover 101 in the Z-direction, respectively.

In such a way, in the present embodiment, the permanent magnets 103 are attached to the mover 101 such that the permanent magnets 103 are shifted and arranged asymmetrically in the Z-direction on the side faces on the R-side and the L-side.

The positions in the Z-direction of lines of the coils 202 are different for the R-side and the L-side as illustrated in FIG. 16 in the stator 201 in association with the fact that positions in the Z-direction of the permanent magnets 103 are different from each other in the side faces on the R-side and the L-side of the mover 101 as described above. That is, the line of the coils 202R, which are the coils 202 on the R-side, is arranged in parallel to the X-direction so as to be able to face the permanent magnets 103cR and 103dR on the side face on the R-side of the mover 101. On the other hand, the line of the coils 202L, which are the coils 202 on the L-side, is arranged in parallel to the X-direction so as to be able to face the permanent magnets 103aL and 103bL on the side face on the L-side of the mover 101.

In the case of the mover 101 according to the present embodiment, respective components indicated in Equation (6) of the force T applied to the mover 101 are expressed by Equations (21a), (21b), (21c), (21d), (21e), and (21f) below.

$$Tx = FxbR + FxfL \quad \text{Equation (21a)}$$
$$Ty = FyfL + FybR \quad \text{Equation (21b)}$$
$$Tz = FzbR + FzfL \quad \text{Equation (21c)}$$
$$Twx = (FzfL - FzbR)*ry1 + (FybR - FyfL)*rz1 \quad \text{Equation (21d)}$$
$$Twy = (FzfL - FzbR)*rx1 \quad \text{Equation (21e)}$$
$$Twz = (FybR - FyfL)*rx2 \quad \text{Equation (21f)}$$

Therefore, even when the permanent magnets 103 are arranged asymmetrically, the six-axis force of the three-axis force components (Tx, Ty, Tz) and the three-axis moment components (Twx, Twy, Twz) can be applied to the mover 101 by using the plurality of coils 202 arranged in two lines.

As described above, according to the present embodiment, the six-axis force of three-axis force components (Tx, Ty, Tz) and three-axis force components (Twx, Twy, Twz) can be applied to the mover 101 by using the plurality of coils 202 arranged in two lines. Thereby, it is possible to control transport of the mover 101 while controlling the attitude of the mover 101 with respect to six axes. According to the present embodiment, it is possible to control transport of the mover 101 while controlling the attitude of the mover 101 with respect to six axes by using two lines of the coils 202 where the number of lines is smaller than the number of six-axis components of force that are variables to be controlled.

Therefore, according to the present embodiment, since the number of lines of the coils 202 can be smaller, it is possible to transport the mover 101 contactlessly while controlling the attitude of the mover 101 without involving an increase in size or an increase in complexity of the system.

Further, with the permanent magnets 103 being arranged symmetrically on the mover 101 as with the present embodiment, six-axis control of the attitude of the mover 101 and transport control of the mover 101 can be realized by using a smaller number of permanent magnets 103 than in the first embodiment. Thus, according to the present embodiment, since not only the number of lines of the coils 202 but also the number of permanent magnets 103 can be reduced, more inexpensive and compact magnetic levitation type transport system can be configured.

Other Embodiments

The present invention is not limited to the embodiments described above, and various modifications are possible.

For example, in a case of use in a vacuum environment or an underwater environment, an organic substance or the like is likely to scatter or flow out from a member such as plastic used around the coil 202 or in a core material. Further, an adhesive agent for insulation is likely to partially flow out or be further deteriorated in the same manner.

Thus, in particular, in a vacuum environment or an underwater environment or in an environment with less dirt, such as a clean room, it is preferable to cover a coil or a component around the coil with some component to insulate it from the surrounding environment. There are some methods of insulation, and it is preferable to cover one or more coils with a metal box and introduce a gas therein, for example.

Furthermore, to dissipate or emit heat generated from a coil to the outside, the gas is preferably a gas having a large thermal conductivity, preferably a helium gas, for example, or may be a hydrogen gas. However, a nitrogen gas, a carbon dioxide gas, or an air may also provide sufficient component protection performance.

Furthermore, one or more coils may be collectively aligned and enclosed in a box-like shape to form a coil box unit, and a coil line may be formed by aligning a plurality of coil box units. It is preferable to provide a height reference or a position reference to the external of each coil box unit for easier operation to adjust the height or the position to the same in order to align the box units.

Further, while the case where only electromagnetic force received by the permanent magnets 103 from the coils 202 is utilized as levitation force to levitate the mover 101 has been described as an example in the above embodiments, the invention is not limited thereto. For example, when the weight of the mover 101 or the weight of the workpiece 102 placed on the mover 101 is large and the levitation force to be applied in the vertical direction is large, a static pressure of a fluid such as an air may be separately used for levitation to aid the levitation force.

Further, while the case where a plurality of coils 202 are arranged in two lines or one line has been described as an example in the above embodiment, the invention is not limited thereto. The plurality of coils 202 can also be arranged in any of three lines, four lines, and five lines, for example, in accordance with the plurality of permanent magnets 103 arranged on the mover 101. According to the present invention, six-axis control of the attitude of the mover 101 can be realized by using lines of the coils 202 where the number of lines is smaller than six that is the number of variables in six-axis control of the attitude of the mover 101.

Further, the transport system according to the present invention can be used as a transport system that transports a workpiece together with a mover to a working region of each process apparatus such as a machine tool that performs each working process on the workpiece that is to be an article in a manufacturing system that manufactures an article such as an electronic component. The process apparatus that performs a working process may be any apparatus such as an apparatus that performs assembling of components on a workpiece, an apparatus that performs coating or painting, or the like. Further, an article to be manufactured is not particularly limited, and any article may be manufactured.

As described above, an article can be manufactured by using the transport system according to the present invention to transport a workpiece to a working region and performing a working process on the workpiece transported in the working region. As described above, the transport system according to the present invention involves neither increase in size nor increase in complexity of the system. Therefore, an article manufacturing system that employs the transport system according to the present invention for transportation of a workpiece can also provide a significantly flexible layout of apparatuses that perform respective working processes without involving an increase in size or an increase in complexity of the system. According to the present invention, it is possible to transport a mover contactlessly while controlling the attitude of the mover without involving an increase in size of system arrangement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-149579, filed Aug. 8, 2018, and Japanese Patent Application No. 2018-231005, filed Dec. 10, 2018, which are hereby incorporated by reference herein in their entirety.

What is claimed is:

1. A transport system comprising:
a first member including at least one coil;
a second member including at least one magnet arranged capable of facing the coil; and
a control unit that applies current to the coil,
wherein the second member is movable relative to the first member, and
wherein the control unit applies the current to the coil so as to control each of six-axis components of force to move the second member relative to the first member.

2. The transport system according to claim 1, wherein the control unit applies the current to the coil so that the first member and the second member do not contact each other.

3. The transport system according to claim 2, wherein the control unit applies current to the coil so as to generate force to levitate the second member.

4. The transport system according to claim 1, wherein the first member includes a plurality of the coils, the plurality of the coils being arranged in one line or more and five lines or less/along a first direction.

5. The transport system according to claim 4, wherein the second member includes a plurality of the magnets, the plurality of the magnets includes a first magnet group and a second magnet group, the first magnet group includes a plurality of first magnets arranged along the first direction, and the second magnet group includes a plurality of second magnets arranged along a second direction crossing the first direction.

6. The transport system according to claim 5, wherein first magnets arranged next to each other included in the plurality of first magnets have different polarities from each other, and
wherein second magnets arranged next to each other included in the plurality of second magnets have different polarities from each other.

7. The transport system according to claim 1, wherein the second member includes a workpiece holder, a first face, and a second face,
wherein the magnet is arranged in the first face, and
wherein the workpiece holder is arranged in the second face.

8. The transport system according to claim 1, wherein the first member includes at least one encoder.

9. The transport system according to claim 1, wherein the second member includes a yoke, and
wherein the magnet is arranged on the yoke.

10. A method for manufacturing an article, the method comprising:
transporting a workpiece by using the transport system according to claim 1; and
performing, by using a process apparatus, a processing on the workpiece.

11. The transport system according to claim 1, wherein the six-axis components includes a component of a first direction, a component of a rotational direction around the first direction, a component of a second direction crossing the first direction, and a component of a rotational direction around the second direction.

12. The transport system according to claim 11, wherein the six-axis components further includes a component of a third direction crossing the second direction and a component of a rotational direction around the third direction.

13. The transport system according to claim 12, wherein the first direction and the second direction are orthogonal to each other and the third direction is orthogonal to the first direction and the second direction.

14. The transport system according to claim 11, wherein the first member includes a plurality of the coils, the plurality of the coils being arranged along the first direction.

15. The transport system according to claim 1, wherein the first member includes a plurality of the coils, the plurality of the coils being arranged in two lines.

16. A control method of controlling a transport system, the transport system comprising a first member including at least one coil, a second member including at least one magnet arranged capable of facing the coil, and a control unit that applies current to the coil, wherein the second member is movable relative to the first member, the control method comprising:

the control unit applying the current to the coil so as to control each of six-axis components of force to move the second member relative to the first member.

17. The control method according to claim 16, wherein the control unit applies the current to the coil so that the first member and the second member do not contact each other.

18. The control method according to claim 17, wherein the control unit applies current to the coil so as to generate force to levitate the second member.

\* \* \* \* \*